US012437504B1

(12) United States Patent
Wei et al.

(10) Patent No.: US 12,437,504 B1
(45) Date of Patent: Oct. 7, 2025

(54) VIDEO CORRECTNESS CHECKING

(71) Applicant: Ambarella International LP, Santa Clara, CA (US)

(72) Inventors: Ching-Ming Wei, Hsinchu (TW); Pei-Chien Yu, Taipei (TW)

(73) Assignee: Ambarella International LP, Santa Clara, CA (US)

( * ) Notice: Subject to any disclaimer, the term of this patent is extended or adjusted under 35 U.S.C. 154(b) by 714 days.

(21) Appl. No.: 17/703,056

(22) Filed: Mar. 24, 2022

(51) Int. Cl.
*G06V 10/30* (2022.01)
*G06T 5/20* (2006.01)
*G06T 5/70* (2024.01)
*G06T 5/73* (2024.01)
*G06T 5/90* (2024.01)
*G06V 10/74* (2022.01)

(52) U.S. Cl.
CPC .............. *G06V 10/761* (2022.01); *G06T 5/20* (2013.01); *G06T 5/70* (2024.01); *G06T 5/73* (2024.01); *G06T 5/90* (2024.01); *G06V 10/30* (2022.01)

(58) Field of Classification Search
CPC ........ G06V 10/761; G06V 10/30; G06T 5/20; G06T 5/70; G06T 5/73; G06T 5/90
See application file for complete search history.

(56) References Cited

U.S. PATENT DOCUMENTS

| 2022/0038749 | A1* | 2/2022 | Shang | G06N 3/045 |
| 2022/0066456 | A1* | 3/2022 | Ebrahimi Afrouzi | G06F 3/04883 |
| 2022/0086466 | A1* | 3/2022 | Holland | H04N 19/176 |

OTHER PUBLICATIONS

J. R. Navarro-Cerdan, J. Arlandis, J.-C. Perez-Cortes and R. Llobet, "User-Defined Expected Error Rate in OCR Postprocessing by Means of Automatic Threshold Estimation," 2010 12th International Conference on Frontiers in Handwriting Recognition, Kolkata, India, 2010, pp. 405-409 (Year: 2010).*

\* cited by examiner

*Primary Examiner* — Ming Y Hon
*Assistant Examiner* — Amanda H Pearson
(74) *Attorney, Agent, or Firm* — Maiorana Patent Law, PA

(57) ABSTRACT

An apparatus comprising an interface and a processor. The interface may be configured to receive pixel data from a capture device. The processor may be configured to process the pixel data arranged as video frames, generate similar images from the video frames, perform preprocessing on the video frames and the similar images, perform a similarity check between the video frames and the similar images and determine an image correctness in response to the similarity check. The preprocessing of the video frames and the similar images may use a same hardware pipeline. The video frames may be discarded if the image correctness is below a threshold value.

20 Claims, 12 Drawing Sheets

VIDEO CORRECTNESS CHECKING

FIELD OF THE INVENTION

The invention relates to video capture generally and, more particularly, to a method and/or apparatus for implementing video correctness checking.

BACKGROUND

Video correctness checking is an important feature in video capture devices. Video correctness ensures reliability of the video data generated. Reliable video data is needed for object detection to prevent false positives or false negatives. As video analysis and object detection are increasingly used to perform autonomous decision making, generating reliable video data is crucial to ensuring that decisions are not being made based on improper input. Video correctness can be a safety factor. In particular, in automotive applications, incorrect decisions made as a result of a video error can be a personal safety hazard or cause property damage. Video processor developers continually strive to prevent video errors. However, checking for video errors can be costly in terms of hardware costs and computational costs. Correctness checking is a key feature for a safety function design of a microprocessor.

Video correctness checking relies on comparing video frames. Conventional methods for performing video correctness checking rely on implementing additional hardware components to duplicate hardware paths, or additional data flow processing in order to perform the appropriate comparisons. Duplicating hardware paths to generate two outputs for error checking comparisons is costly to implement and results in larger component sizes. Additional data flow processing to perform the same processes multiple times to generate two outputs for error checking comparisons degrades system performance (i.e., long processing times, heat generation, power requirements, etc.).

It would be desirable to implement video correctness checking.

SUMMARY

The invention concerns an apparatus comprising an interface and a processor. The interface may be configured to receive pixel data from a capture device. The processor may be configured to process the pixel data arranged as video frames, generate similar images from the video frames, perform preprocessing on the video frames and the similar images, perform a similarity check between the video frames and the similar images and determine an image correctness in response to the similarity check. The preprocessing of the video frames and the similar images may use a same hardware pipeline. The video frames may be discarded if the image correctness is below a threshold value.

BRIEF DESCRIPTION OF THE FIGURES

Embodiments of the invention will be apparent from the following detailed description and the appended claims and drawings.

DETAILED DESCRIPTION OF THE EMBODIMENTS

Figure 1:
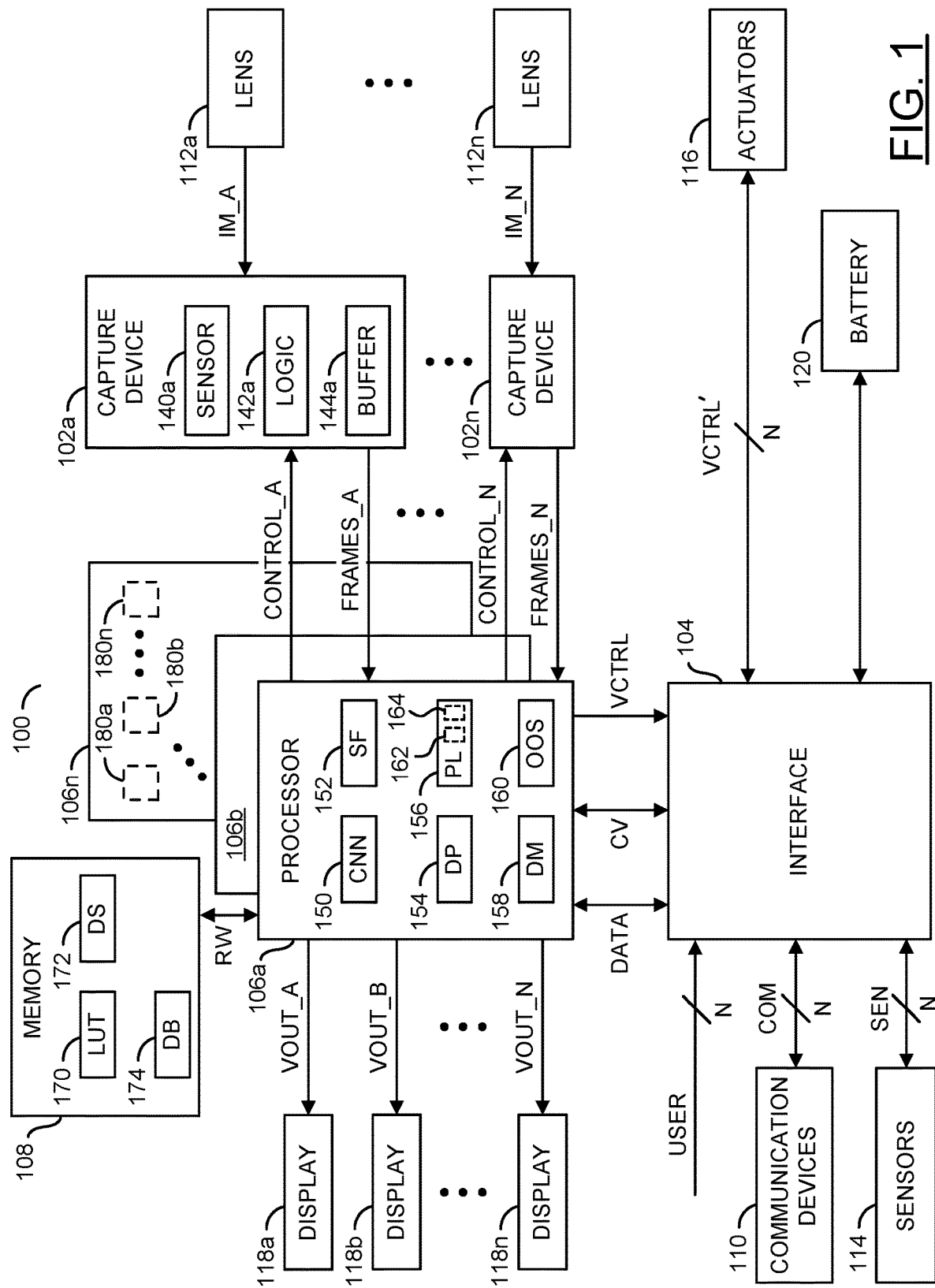
FIG. 1 is a diagram illustrating an embodiment of the present invention.

Embodiments of the present invention include providing video correctness checking that may (i) detect bad blocks in a video frame, (ii) utilize view zones of a video processor to generate similar images, (iii) perform preprocessing on captured images and similar images in parallel in a hardware video processing pipeline, (iv) prevent duplicating hardware to perform error checking, (v) perform video processing a single time to generate a video frame and a similar image for a video error check, (vi) downsample a preprocessed input video frame to match calculations for a similar image, (vii) compare a structural similarity calculation on pixel blocks of a video frame to a correctness threshold, (viii) detect errors in surveillance video, (ix) detect errors for on-vehicle cameras and/or (x) be implemented as one or more integrated circuits.

Embodiments of the present invention may be configured to perform efficient video correctness checking. The efficient video correctness checking may implement a similarity image generator to generate images similar to captured images that may be compared. The comparison of the captured (e.g., input) images and the similar images may be used to determine whether the video passes correctness checking or not.

Video artifacts (e.g., any defect) may result in the captured video failing a video correctness check. The bad blocks in a video image may comprise a portion of a video frame comprising blockiness, a color error, a broken line, a bad spot, etc. Bad blocks may lead to visible errors in video output, an incorrect basis for performing object detection and/or other computer vision operations. The video correctness check may identify bad blocks, discard video frames that fail the video correctness check and/or generate a signal in order to initiate other reactions (e.g., a system reboot) in response to failing the video correctness check.

Embodiments of the present invention may implement a hardware video processing pipeline that may enable parallel processing of multiple view zones. The multiple view zones may be generated in response to regions of interest of an image sensor that captures the pixel data. Hardware modules implemented in the video processing pipeline may be configured to perform operations on the pixel data in multiple view zones in parallel, regardless of the output arrangement of the pixel data (e.g., the pixel data that may be used for two separate output video frames may be operated on at the same time). The view zones may enable a similar image to be generated from the same pixel data that is used to generate the input video frame.

The similar images may be generated in response to a combination of non-linear filters, multiresolution linear filters, noise reduction filters, etc. In one example, the similar image may be a smaller sized image generated from the input image in response to a downsampling operation. In another example, the similar image may be generated in response to an upscale operation. The input image may be compared to the similar image. The particular type of operation used to generate the similar image may be selected based on strengths (e.g., efficient processes, hardware resources available, etc.) of a particular video processor. Using the view zones to enable the similar images to be processed in parallel with the input images may enable video correctness checking without adding additional hardware components for error checking or using additional processing time to perform the video correctness check.

The video correctness check may be implemented without duplicating a video processing hardware pipeline. The view zones implemented by the video hardware pipeline may enable the preprocessing of the input images and the similar images to be performed in parallel in order to avoid repeating calculations for both the input images and the similar images. The input image may pass through an image processing portion of the video hardware pipeline in order to generate an output image. The output image may be one input for the comparison for the video correctness check. The similar image may be generated from the input image and pass through the same image processing in parallel with the input image in order to generate a second output image. The second output image may be the other input for the comparison for the video correctness check.

The view zones implemented by the video processing hardware pipeline may enable the similar images to be generated and/or processed efficiently. A similarity index may be checked between the input image and the similar image in order to determine whether the input image passes the video correctness check. The video processor may select a response to a video correctness check failure. In one example, the entire video capture system may be rebooted in response to failing the video correctness check. In another example, a control signal may be generated in response to failing the video correctness check in order to increase cooling to the video processor and/or the device that captures the pixel data (e.g., overheating may be the cause of the video error). In yet another example, the video frames may be discarded and an error number may be incremented in response to failing the video correctness check and a response may be deferred until a predetermined number of errors are detected. The types of operations performed in response to detecting a video error may be varied according to the design criteria of a particular implementation.

Referring to FIG. 1, a diagram illustrating an embodiment of the present invention is shown. The apparatus 100 generally comprises and/or communicates with blocks (or circuits) 102a-102n, a block (or circuit) 104, blocks (or circuits) 106a-106n, a block (or circuit) 108, a block (or circuit) 110, blocks (or circuits) 112a-112n, a block (or circuit) 114, a block (or circuit) 116, blocks (or circuits) 118a-118n and/or a block (or circuit) 120. The circuits 102a-102n may each implement a capture device. The circuit 104 may implement an interface circuit. The circuits 106a-106n may each implement a processor (or co-processors). In an example implementation, the circuits 106a-106n may each be implemented as a video processor and/or a computer vision processor. The circuit 108 may implement a memory. The circuit 110 may implement one or more communication devices. The blocks 112a-112n may implement lenses. The circuit 114 may implement one or more vehicle sensors. The circuit 116 may implement one or more vehicle actuators. The circuits 118a-118n may each implement a display. The circuit 120 may implement a power storage device (e.g., a battery). The apparatus 100 may comprise other components (not shown). The number, type and/or arrangement of the components of the apparatus 100 may be varied according to the design criteria of a particular implementation.

In various embodiments of the apparatus 100, the components 102a-118n may be implemented as a distributed camera system 100. In the distributed system embodiment of the apparatus 100, each component may be implemented separately throughout an installation location (e.g., such as a vehicle). In some embodiments of the apparatus 100, the components 102a-118n may be implemented on a printed circuit board (e.g., a single module). In the single module embodiment, each component may be connected to a single module (e.g., such as a circuit board on a small device such as a drone). In some embodiments, some of the components 102a-118n may be implemented on a single module and some of the components 102a-118n may be distributed throughout the installation location. For example, the apparatus 100 may be implemented as a drop-in solution (e.g., installed as one component). In some embodiments, the apparatus 100 may be a device that may be installed as an after-market product for a vehicle (e.g., a retro-fit for a vehicle). In some embodiments, one or more of the components 102a-118n may be a component separate from the apparatus 100 that may be accessed by the interface 104 and/or the processors 106a-106n.

In some embodiments, the apparatus 100 may implement one of the processors 106a-106n. In some embodiments, the apparatus 100 may implement multiple processors 106a-106n. For example, the processor 106a may have multiple co-processors 106b-106n. Similarly, the interface 104 may be implemented as multiple interfaces each supporting different communication protocols. In another example, the communication devices 110 may be implemented as many modules, each implementing a different communications standard (e.g., Bluetooth, Wi-Fi, LTE, etc.). In some embodiments, one or more of the components 102a-118n may be implemented as part of another one of the components 102a-118n. For example, the memory 108 may be implemented as a component of the processors 106a-106n. In another example, the lenses 112a-112n and the capture devices 102a-102n may each be implemented as a respective single assembly. Generally, the apparatus 100 may be implemented as a system-on-chip (SoC).

The lenses 112a-112n (e.g., an optical lens) may be configured to capture a targeted view. Some of the lenses 112a-112n may be implemented to provide a targeted view of an area exterior to an object (e.g., the outside of a car). Some of the lenses 112a-112n may be implemented to provide a targeted view of an interior of an object (e.g., the cabin of a vehicle). The lenses 112a-112n may each capture and/or focus light as input data (e.g., IM_A-IM_N) and present the respective light input data IM_A-IM_N to a respective one of the capture devices 102a-102n.

In embodiments implementing many of the lenses 112a-112n, each of the lenses 112a-112n may point in a different direction. By having each of the lenses 112a-112n capture a different direction, the apparatus 100 may capture a panoramic view of the environment and/or the interior of a vehicle. The lenses 112a-112n may be arranged to capture fields of view above and/or below a level of the vehicle. In some embodiments, the lenses 112a-112n may be implemented having a wide angle (or fisheye) lens. The panoramic video may comprise a large field of view generated by one or more lenses/camera sensors. One example of a panoramic video may be a 360 equirectangular video. Equirectangular video may also be called spherical panoramas. Panoramic video may be a video that provides a field of view that is larger than the field of view that may be displayed on a device used to playback the video (e.g., one of the displays 118a-118n).

Each of the capture devices 102a-102n may comprise one of blocks (or circuits) 140a-140n, one of blocks (or circuits) 142a-142n and/or one of blocks (or circuits) 144a-144n. The blocks 140a-140n may implement an image sensor (e.g., a camera sensor). The blocks 142a-142n may implement logic. The blocks 144a-144n may implement a buffer. For clarity, in the example shown, only the image sensor 140a, the logic 142a and the buffer 144a of the capture device 102a are shown. The capture devices 102a-102n may each be configured to (i) receive a respective one of the signals IM_A-IM_N, (ii) receive a respective signal (e.g., CONTROL_A-CONTROL_N), and/or (iii) present a respective signal (e.g., FRAMES_A-FRAMES_N).

The capture devices 102a-102n may each be configured to generate raw pixel data in response to the signals IM_A-IM_N (e.g., perform a photoelectric conversion). The capture devices 102a-102n may be configured to present pixel data as an analog signal or as a digital signal (e.g., perform an analog to digital conversion). The capture devices 102a-102n may capture data received through the lenses 112a-112n to generate raw pixel data and/or video image data. In an example, the capture devices 102a-102n may present the raw pixel data in Bayer pattern, RGB, or YUV formats. In some embodiments, the capture devices 102a-102n may generate video frames. In some embodiments, the capture devices 102a-102n may generate raw pixel data and the processors 106a-106n may generate the video frames from the raw pixel data.

The signals FRAMES_A-FRAMES_N may comprise raw pixel data, video frames and/or still images generated by the capture devices 102a-102n (e.g., video data). In the example shown, the signals FRAMES_A-FRAMES_N (e.g., video frames) may be communicated from the capture devices 102a-102n to the processors 106a-106n. In another example, signals comprising the raw pixel data may be communicated from the capture devices 102a-102n to the processors 106a-106n and the processors 106a-106n may generate the signals FRAMES_A-FRAMES_N (e.g., the signals FRAMES_A-FRAMES_N may be generated internal to the processors 106a-106n). In some embodiments, the capture devices 102a-102n may be directly connected to the processors 106a-106n. In some embodiments, the capture devices 102a-102n may be connected to the processors 106a-106n by respective cables. In an example, the capture devices 102a-102n may be connected to the processors 106a-106n using a serial communication protocol between serializer-deserializer pairs.

In some embodiments, the capture devices 102a-102n and/or the processors 106a-106n may be configured to perform depth sensing (e.g., the signals FRAMES_A-FRAMES_N may comprise depth information and/or vector light data in addition to the video frames). In one example, the capture devices 102a-102n and/or the processors 106a-106n may perform depth sensing using multiple cameras (e.g., cameras configured as a stereo pair to capture a depth map). In another example, the capture devices 102a-102n and/or the processors 106a-106n may perform depth sensing using time-of-flight. In yet another example, the capture devices 102a-102n and/or the processors 106a-106n may perform depth sensing using structured light.

The video frames FRAMES_A-FRAMES_N may be presented to one or more of the processors 106a-106n. The signals CONTROL_A-CONTROL_N may comprise instruction signals for the capture devices 102a-102n and/or the lenses 112a-112n (e.g., to zoom, pan, focus, adjust settings, etc.). The signals CONTROL_A-CONTROL_N may be generated by the processors 106a-106n.

The interface circuit 104 may be configured to transmit and/or receive a number of signals. The interface circuit 104 may be configured to communicate information and/or convert information to/from various protocols. In some embodiments, the interface 104 may be implemented as one of the components of the processors 106a-106n. In some embodiments, the interface 104 may be implemented as a vehicle bus (e.g., a CAN bus). For example, for low speed communication, the vehicle CAN bus may be implemented. In some embodiments, the interface 104 may implement a high speed data transmission protocol (e.g., for video transmission). For example, the interface 104 may implement one or more of Ethernet, PCI-e, MIPI, etc. In some embodiments, the interface 104 may comprise many different components, each configured to communicate using a particular protocol. The interface 104 may comprise a data bus, traces, connectors, wires and/or pins. The implementation of the interface 104 may be varied according to the design criteria of a particular implementation.

In the example shown, the interface 104 may send and/or receive a signal (e.g., DATA), a signal (e.g., CV), a signal (e.g., VCTRL), a signal (e.g., COM), a signal (e.g., SEN), a signal (e.g., VCTRL') and/or a signal (e.g., USER). The signal USER may represent user inputs (e.g., turn signals, pressing the accelerator, pressing the brakes, interactions with an infotainment system, etc.). The signal SEN may represent information related to the vehicle sensors 114 such as calibration data from the processors 106a-106n and/or status information of the vehicle based on sensor readings (e.g., speed, acceleration, temperature, location, gyro orientation, etc.). The signal COM may represent information communicated to/from the communication devices 110. The signal VCTRL and VCTRL' may represent control instructions generated by the processors 106a-106n for the various vehicle actuators 116. The signal CV may represent computer vision data. The signal DATA may represent other data. The number of signals communicated and/or the types of data communicated using the interface 104 may be varied according to the design criteria of a particular implementation.

The processors 106a-106n may each comprise a block (or circuit) 150, a block (or circuit) 152, a block (or circuit) 154, a block (or circuit) 156, a block (or circuit) 158 and/or a block (or circuit) 160. The block 150 may implement one or more artificial neural networks (ANNs) configured to provide artificial intelligence and/or computer vision operations. In an example, the one or more ANNs may comprise a convolutional neural network (CNN) module and/or a generative adversarial network (GAN) trained to provide images processing, object detection, object recognition, object classification, etc. The block 152 may implement a sensor fusion module. The block 154 may implement a driving policy module. The block 156 may implement a video processing pipeline module. The block 158 may implement a decision making module. The block 160 may implement an open operand stack module. The processors 106a-106n may comprise other components (not shown). In some embodiments, one or more of the processors 106a-106n may not comprise each of the blocks 150-160. The modules 150-160 may each be implemented as dedicated hardware modules of the processors 106a-106n. The number, type and/or arrangement of the components of the processors 106a-106n may be varied according to the design criteria of a particular implementation.

The processors 106a-106n may implement a low-power system-on-a-chip (SoC). The processors 106a-106n may provide artificial intelligence (AI), advanced image signal processing and high-resolution video compression. The processors 106a-106n may be configured to perform processing locally to enable the apparatus 100 to be implemented in edge devices. The processors 106a-106n may enable edge devices to visually perceive the environment and make decisions based on the data collected from the capture devices 102a-102n and other types of sensors (e.g., the sensors 114). The architecture of the video processing pipeline 156 may enable the processors 106a-106n to support a variety of computer vision processes, such as: object detection, classification and tracking, semantic and instance segmentation, image processing, stereo object detection, terrain mapping, face recognition, etc.

The processors 106a-106n may be configured to execute computer readable code and/or process information. The processors 106a-106n may each be configured to receive the signals FRAMES_A-FRAMES_N, transmit the signal VCTRL, signals (e.g., VOUT_A-VOUT_N) and/or send/receive the signal DATA, the signal CV and/or a signal (e.g., RW). The signals VOUT_A-VOUT_N may each provide a video data output to a corresponding one of the displays 118a-118n. For example, the processors 106a-106n may be configured to generate the video data (e.g., VOUT_A-VOUT_N) for the displays 118a-118n in response to the video frames (e.g., FRAMES_A-FRAMES_N). The signal RW may communicate data to/from the memory 108. The signal VOUT_A-VOUT_N, the signals CONTROL_A-CONTROL_N, the signal DATA, the signal CV, the signal RW and/or the signal VCTRL may be generated based on one or more decisions made by the processors 106a-106n. The decisions made by the processors 106a-106n may be determined based on data received by the processors 106a-106n and/or based on an analysis of the signals FRAMES_A-FRAMES_N. The processors 106a-106n may implement other signals (not shown). The processors 106a-106n may comprise an interface configured to receive pixel data, video frames, audio data, sensor data, data from external sources, etc. In an example, the interface of the processors 106a-106n may be configured to enable Gigabit Ethernet, a USB 2.0 host and device, multiple (e.g., three) SD card controllers with SDXC support and/or MIPI-DSI/CSI output. The number and/or type of signals communicated by the processor 106a-106n may be varied according to the design criteria of a particular implementation.

The memory 108 may comprise a block (or circuit) 170, a block (or circuit) 172 and/or a block (or circuit) 174. The block 170 may implement a look up table. The block 172 may implement data storage. The block 174 may implement database storage (e.g., image feature sets, vehicle status, view options, GNSS/GPS positions, a schedule of a user, driver behavior, expected travel times/routes, user preferences, etc.). The memory 108 may be configured to store computer readable/executable instructions (or firmware or code). The instructions, when executed by the processors 106a-106n, may perform a number of steps. In some embodiments, the processors 106a-106n may be implemented as a system-on-chip (SoC) and the memory 108 may be a component of the processors 106a-106n. In some embodiments, the memory 108 may be implemented as part of a black box recorder implemented to survive collisions (e.g., to preserve data to assist in an investigation). The arrangement and/or type of data stored and/or the memory technology implemented (e.g., NAND, RAM, memristor, etc.) by the memory 108 may be varied according to the design criteria of a particular implementation.

The communication devices 110 may send and/or receive data to/from the apparatus 100. In some embodiments, the communication devices 110 may be implemented as a wireless communications module. In some embodiments, the communication devices 110 may be implemented as a satellite connection to a proprietary system (e.g., to provide advanced driver-assistance systems (ADAS) data and/or telemetry data). In some embodiments, the communication devices 110 may implement GPS and/or GNSS functionality. In one example, the communication device 110 may be a hard-wired data port (e.g., a USB port, a mini-USB port, a USB-C connector, HDMI port, an Ethernet port, a DisplayPort interface, a Lightning port, a Thunderbolt port, a PCI-e interface, a MIPI interface, etc.). In another example, the communication device 110 may be a wireless data interface (e.g., Wi-Fi, Bluetooth, ZigBee, cellular (3G/4G/5G/LTE), etc.). In another example, the communication devices 110 may implement a radio-frequency (RF) transmitter.

The communication devices 110 may include support for wireless communication by one or more wireless and/or cellular protocols such as Bluetooth®, ZigBee®, IEEE 802.11, IEEE 802.15, IEEE 802.15.1, IEEE 802.15.2, IEEE 802.15.3, IEEE 802.15.4, IEEE 802.15.5, IEEE 802.20, GSM, CDMA, GPRS, UMTS, CDMA2000, 3GPP LTE, 4G/HSPA/WiMAX, SMS, etc. The communication devices 110 may also include support for communication using one or more of the universal serial bus protocols (e.g., USB 1.0, 2.0, 3.0, etc.).

The sensors 114 may be used to determine the status information of the host object (e.g., the vehicle). The sensors 114 may implement a sensor array. The sensor array 114 may be used to determine the position of objects in a proximity range with respect to the apparatus 100. For example, the sensors 114 may implement a radar device, an array of radars, a sonar device, an array of sonars, a lidar device, an array of lidar devices, an ultra-sound device, an array of ultra-sound devices, a passive infrared (PIR) sensor, a thermometer, a gyroscope, a compass, etc. The sensors 114 may provide the sensor readings using the signal SEN. In some embodiments, the sensors 114 may be calibrated using the signal SEN. The types of the vehicle sensors 114 used to detect a proximity to other objects may be varied according to the design criteria of a particular implementation.

The actuators 116 may be used to cause an action. The actuators 116 may be implemented as an array of components. The actuators 116 may be configured to convert an electrical signal comprising information and/or instructions (e.g., the signal VCTRL') into a physical action. In an example, the actuators 116 may be configured to turn wheels, increase an acceleration, decrease an acceleration, activate and/or adjust headlights, activate a turn signal, activate air bags, engage/disengage locks, adjust heating/cooling control settings, adjust fan speed, adjust heated seats, etc. In some embodiments, the actuators 116 may implement speakers (interior or exterior speakers). In one example, the actuators 116 may implement speakers that have been mandated by federal regulations for all new electric vehicles to make noise when the vehicle is moving at low speed (e.g., to alert pedestrians. The actuators 116 may control various components of the host vehicle. The number, type and/or functionality of the actuators 116 may be varied according to the design criteria of a particular implementation.

The displays 118a-118n may each implement a screen and/or an output device. In one example, one or more of the displays 118a-118n may implement an electronic mirror (e.g., an e-mirror). In another example, one or more of the displays 118a-118n may implement a touchscreen for an infotainment system. In yet another example, one or more of the displays 118a-118n may implement a back-up camera and/or bird's-eye view camera. The displays 118a-118n may display a version of video frames captured by one or more of the lenses 112a-112n and/or the capture devices 102a-102n. The video frames captured by the capture device 102a-102n may be cropped, adjusted and/or encoded by the processors 106a-106n to fit the displays 118a-118n. For example, the processor 106a-106n may provide real-time video streaming to the displays 118a-118n via the signals VOUT_A-VOUT_N.

The battery 120 may be configured to provide a power supply to a vehicle. In an example, the battery 120 may comprise a car battery. The battery 120 may supply the power source for driving an electric vehicle and/or operating the accessories of an electric vehicle. The battery 120 may further provide the power source for accessory functions (e.g., displaying content on the displays 118a-118n, controlling power windows, controlling locks, controlling temperature, powering the capture devices 102a-102n, communicating using the communication devices 110, powering the sensors 114, controlling the actuators 116, powering the processors 106a-106n, etc.). The battery 120 may be configured to report a capacity to the interface 104. For example, the processors 106a-106n may be configured to read the remaining capacity of the battery 120 (e.g., a percentage of charge left).

The sensor 140a (e.g., a camera imaging sensor such as a CMOS sensor) of the capture device 102a may receive light from the lens 112a (e.g., the signal IM_A). The camera sensor 140a may perform a photoelectric conversion of the light from the lens 112a. The camera sensor 140a may generate a bitstream comprising pixel data values. The logic 142a may transform the bitstream into a human-legible content (e.g., video data and/or video frames). In one example, the logic 142a may receive pure (e.g., raw) data from the camera sensor 140a and generate video data based on the raw data (e.g., the bitstream). For example, the sensor 140a and/or the logic 142a may be configured perform image signal processing on raw data captured and read out YUV data. In some embodiments, the sensor 140a may read out raw data and the image signal processing may be performed by the processors 106a-106n. In one example, the capture devices 102a-102n may provide a direct connection to the processors 106a-106n. For example, the processors 106a-106n may be configured to receive triple-sensor video input with high-speed SLVS/MIPI-CSI/LVCMOS interfaces. In another example, the capture devices 102a-102n may be connected to the processors 106a-106n using a serializer-deserializer pair. The logic 142a may further control the lens 112a in response to the signal CONTROL_A. The memory buffer 144a may store the raw data, frames and/or the processed bitstream. For example, the memory and/or buffer 144a may be configured as a frame buffer that may store (e.g., provide temporary storage and/or cache) one or more of the video frames (e.g., the video signal). In some embodiments, each of the capture devices 102a-102n may comprise other components (e.g., a battery, a motor, a microphone, etc.).

In some embodiments, the sensor 140a may implement an RGB-InfraRed (RGB-IR) sensor. The sensor 140a may comprise a filter array comprising a red filter, a green filter, a blue filter and a near-infrared (NIR) wavelength filter (e.g., similar to a Bayer Color Filter Array with one green filter substituted with the NIR filter). The sensor 140a may operate as a standard color sensor and a NIR sensor. Operating as a standard color sensor and NIR sensor may enable the sensor 140a to operate in various light conditions (e.g., day time and night time).

The ANNs 150 may be configured to implement various artificial intelligence models. In the example shown, the ANNs 150 may be described as a convolutional neural network module. For simplicity, the ANNs 150 may be described as the CNN module 150. However, other types of artificial intelligence models may be implemented.

The CNN module 150 may be configured to implement convolutional neural network capabilities. The CNN module 150 may be configured to implement computer vision using deep learning techniques. The CNN module 150 may be configured to implement pattern and/or image recognition using a training process through multiple layers of feature-detection. The CNN module 150 may be configured to conduct inferences against a machine learning model.

The CNN module 150 may be configured to perform feature extraction and/or matching solely in hardware. Feature points typically represent interesting areas in the video frames (e.g., corners, edges, etc.). By tracking the feature points temporally, an estimate of ego-motion of the capturing platform or a motion model of observed objects in the scene may be generated. In order to track the feature points, a matching algorithm is generally incorporated by hardware in the CNN module 150 to find the most probable correspondences between feature points in a reference frame and a target frame. In a process to match pairs of reference and target feature points, each feature point may be represented by a descriptor (e.g., image patch, SIFT, BRIEF, ORB, FREAK, etc.). Implementing the CNN module 150 using dedicated hardware circuitry may enable calculating descriptor matching distances in real time.

The CNN module 150 may be a dedicated hardware module configured to perform feature detection of the video frames. The features detected by the CNN module 150 may be used to calculate descriptors. The CNN module 150 may determine a likelihood that pixels in the video frames belong to a particular object and/or objects in response to the descriptors. For example, using the descriptors, the CNN module 150 may determine a likelihood that pixels correspond to a particular object (e.g., a person, a vehicle, a car seat, a tree, etc.) and/or characteristics of the object (e.g., a mouth of a person, a hand of a person, headlights of a vehicle, a branch of a tree, a seatbelt of a seat, etc.).

Implementing the CNN module 150 as a dedicated hardware module of the processors 106a-106n may enable the apparatus 100 to perform the computer vision operations locally (e.g., on-chip) without relying on processing capabilities of a remote device (e.g., communicating data to a cloud computing service).

The computer vision operations performed by the CNN module 150 may be configured to perform the feature detection on the video frames in order to generate the descriptors. The CNN module 150 may perform the object detection to determine regions of the video frame that have a high likelihood of matching the particular object. In one example, the types of objects to match against (e.g., reference objects) may be customized using the open operand stack module 160. The CNN module 150 may be configured to perform local masking to the region with the high likelihood of matching the particular object(s) to detect the object.

The sensor fusion module 152 may be configured to analyze information from multiple sensors 114, capture devices 102a-102n and/or the database 174 for redundancy. By analyzing various data from disparate sources, the sensor fusion module 152 may be capable of making inferences about the data that may not be possible from one of the data sources alone. For example, the sensor fusion module 152 may analyze video data as well as radar, lidar, inertial, motion, V2X, location data (e.g., GPS, GNSS, ADAS, etc.), gaze direction, driver state, battery status and/or other sources to develop a model of a scenario to support decision making. The sensor fusion module 152 may also provide time correlation, spatial correlation and/or reliability among the data being received from the different sensors 114.

In an example, the sensor fusion module 152 may spatially overlay an object captured by a camera with the same object captured by lidar for better identification and/or ranging (distance and relative velocity) to that object. In a time correlation example, an object may be seen by two sensors at slightly different times (e.g., side-facing sensors near the front bumper and the rear bumper). The sensor fusion module 152 may time shift the data from a leading sensor to align with the data from the trailing sensor. Information from motion sensors may be integrated into the time correlation to determine which sensor is leading, which sensor is trailing and/or how fast the detected object is moving.

In a reliability example, the sensor fusion module 152 may determine the reliability of objects detected by each sensor. The sensor fusion module 152 may adjust the weighting used to overlay the data to give more weight to reliable data and/or less weight to unreliable data (e.g., one of the capture devices 102a-102n may have low reliability in foggy conditions, but radar may have good reliability in foggy conditions). A confidence that the object is really there and is correctly identified may also be calculated in the sensor fusion module 152. The confidence data may be presented to the driving policy block 154 via an on-chip bus, rather than relying on an inter-chip bus.

The driving policy module 154 may be configured to enable human-like intuition. The driving policy module 154 may allow the vehicle to share the road with human drivers. For example, sensing, mapping, and powerful computer vision may provide a model of the environment and/or reaction time of a vehicle to be better than that of a human driver. Applying machine learning to develop and evolve a driving policy may be utilized to provide a human-like intuition and/or behavior needed to analyze multi-variable situations and/or negotiate with human drivers. In an example, the driving policy module 154 may provide a rule set for ethics when making decisions.

The video pipeline 156 may be configured to encode video data and/or video frames captured by each of the capture devices 102a-102n. In some embodiments, the video pipeline 156 may be configured to perform video stitching operations to stitch video frames captured by each of the lenses 112a-112n to generate the panoramic field of view (e.g., the panoramic video frames). The video pipeline 156 may be configured to perform de-warping, cropping, enhancements, rolling shutter corrections, stabilizing (e.g., electronic image stabilization (EIS)), downscaling, packetizing, compression, conversion, blending, synchronizing and/or other video operations. The architecture of the video pipeline 156 may enable the video operations to be performed on high resolution video and/or high bitrate video data in real-time and/or near real-time. The video pipeline module 156 may enable computer vision processing on 4K resolution video data, stereo vision processing, object detection, 3D noise reduction, fisheye lens correction (e.g., real time 360-degree dewarping and lens distortion correction), oversampling and/or high dynamic range processing. In one example, the architecture of the video pipeline 156 may enable 4K ultra high resolution with H.264 encoding at double real time speed (e.g., 60 fps), 4K ultra high resolution with H.265/HEVC at 30 fps, 4K AVC encoding (e.g., 4KP30 AVC and HEVC encoding with multi-stream support) and/or other types of encoding (e.g., VP8, VP9, AV1, etc.). The video data generated by the video pipeline module 156 may be compressed (e.g., using a lossless compression and/or a low amount of lossiness). The type of video operations and/or the type of video data operated on by the video pipeline 156 may be varied according to the design criteria of a particular implementation.

The video pipeline module 156 may implement a digital signal processing (DSP) module configured to receive information (e.g., pixel data values captured by the sensors 140a-140n) from the input signals FRAMES_A-FRAMES_N. The video pipeline module 156 may be configured to determine the pixel values (e.g., RGB, YUV, luminance, chrominance, etc.). The video pipeline module 156 may be configured to perform image signal processing (ISP). The video pipeline module 156 may be further configured to support or provide a sensor RGB to YUV raw image pipeline to improve image quality, perform bad pixel detection and correction, demosaicing, white balance, color and tone correction, gamma correction, adjustment of hue, saturation, brightness and contrast adjustment, sharpening and/or chrominance and luminance noise filtering.

The video pipeline module 156 may encode the raw image data into a plurality of encoded video streams simultaneously (in parallel). The video pipeline module 156 may enable multi-stream support (e.g., generate multiple bitstreams in parallel, each comprising a different bitrate). In an example, the video pipeline module 156 may implement an image signal processor (ISP) with a 320 MPixels/s input pixel rate. The plurality of video streams may have a variety of resolutions (e.g., VGA, WVGA, QVGA, SD, HD, Ultra HD, 4K, 8K, etc.). The video pipeline module 156 may receive encoded and/or unencoded (e.g., raw) audio data from an audio interface. The video pipeline module 156 may also receive encoded audio data from a communication interface (e.g., USB and/or SDIO). The video pipeline module 156 may provide encoded video data to the communication devices 110 (e.g., using a USB host interface) and/or the displays 118a-118n (e.g., the signals VOUT_A-VOUT_N).

The video pipeline module 156 may be configured to implement a raw image pipeline for image signal processing. The video pipeline module 156 may be configured to convert image data acquired from the capture devices 102a-102n. For example, the image data may be acquired from the image sensor 140a in a color filter array (CFA) picture format. The raw image pipeline implemented by the video pipeline module 156 may be configured to convert the CFA picture format to a YUV picture format.

The raw image pipeline implemented by the video pipeline module 156 may be configured to perform demosaicing on the CFA formatted image data to obtain linear RGB (red, green, blue) image data for each picture element (e.g., pixel). The raw image pipeline implemented by the video pipeline module 156 may be configured to perform a white balancing operation and/or color and tone correction. The raw image pipeline implemented by the video pipeline module 156 may be configured to perform RGB to YUV color space conversion. The raw image pipeline implemented by the video pipeline module 156 may be configured to perform noise filtering (e.g., noise reduction, noise correction, etc.) and/or sharpening. The raw image pipeline implemented by the video pipeline module 156 may be configured to implement tone based non-smoothness detection and adjustment. Generally, noise filtering may be performed after each step, operation, and/or conversion performed to reduce any noise introduced by each step.

The video pipeline module 156 may implement scheduling. Scheduling may enable the video pipeline 156 to perform various discrete, asynchronous video operations and/or computer vision operations in parallel. The scheduling may enable data results from one video operation to be available by the time another video data operation needs the data results. The video pipeline module 156 may comprise multiple pipelines, each tuned to perform a particular task efficiently.

The decision making module 158 may be configured to generate the signal VCTRL. The decision making module 158 may be configured to use the information from the computer vision operations and/or the sensor fusion module 152 to determine which actions may be taken. For example, in an autonomous vehicle implementation, the decision making module 158 may determine which direction to turn. The decision making module 158 may utilize data from the CNN module 150 and/or computer vision data using a histogram oriented gradient (HOG). The sources of data for making decisions used by the decision making module 158 may be varied according to the design criteria of a particular implementation.

The decision making module 158 may be further configured to determine the video data to communicate to the displays 118a-118n. The signals VOUT_A-VOUT_N may be cropped and/or adjusted in response to decisions by the decision making module 158. For example, the decision module 158 may select one field of view (e.g., a wide angle field of view) instead of another field of view (e.g., a narrow angle field of view) to send to the display 118a as the signal VOUT_A. In another example, the decision making module 158 may determine which of the displays 118a-118n to use to display a notification (e.g., an advertisement) and/or where on the video data to place the notification. In yet another example, the decision making module 158 may adjust output characteristics of the displays 118a-118n (e.g., brightness, contrast, sharpness, etc.).

The operand stack module 160 generally contains basic tasks used in all autonomous vehicles (e.g., object detection, correlation, reliability, etc.). The openness of the operand stack module 160 may enable car manufacturers to add new and/or proprietary features that could distinguish particular vehicles in the marketplace. The open operand stack module 160 may enable programmability.

The video processing pipeline 156 is shown comprising a block (or circuit) 162 and/or a block (or circuit) 164. The circuit 162 may implement a computer vision pipeline portion. The circuit 164 may implement a disparity engine. The video processing pipeline 156 may comprise other components (not shown). The number and/or type of components implemented by the video processing pipeline 156 may be varied according to the design criteria of a particular implementation.

The computer vision pipeline portion 162 may be configured to implement a computer vision algorithm in dedicated hardware. The computer vision pipeline portion 162 may implement a number of sub-modules designed to perform various calculations used to perform feature detection in images (e.g., video frames). Implementing sub-modules may enable the hardware used to perform each type of calculation to be optimized for speed and/or efficiency. For example, the sub-modules may implement a number of relatively simple operations that are used frequently in computer vision operations that, together, may enable the computer vision algorithm to be performed in real-time. The computer vision pipeline portion 162 may be configured to recognize objects. Objects may be recognized by interpreting numerical and/or symbolic information to determine that the visual data represents a particular type of object and/or feature. For example, the number of pixels and/or the colors of the pixels of the video data may be used to recognize portions of the video data as objects.

The disparity engine 164 may be configured to determine a distance based on images captured as a stereo pair. Two or more of the capture devices 102a-102n may be configured as a stereo pair of cameras. The capture devices 102a-102n configured as a stereo pair may be implemented close to each other at a pre-defined distance and/or have a symmetrical orientation about a central location. The capture devices 102a-102n configured as a stereo pair may be configured to capture video frames from similar, but slightly different perspectives (e.g., angled inwards to capture fields of view that overlap).

The disparity engine 164 may be configured to perform a comparison to analyze the differences between the stereo pair of images. In an example, the processors 106a-106n may detect feature points of the same object detected in both video frames captured by the capture devices 102a-102n configured as a stereo pair. The disparity engine 164 may determine distances (e.g., an offset) of the feature points and then perform calculations based on the characteristics of the stereo pair of capture devices (e.g., angle, distance apart, etc.) and the determined distances of the feature points. Based on the differences between the stereo pair of images and the pre-defined distance between the capture devices 102a-102n configured as a stereo pair, the disparity engine 164 may be configured to determine a distance. The distance determined by the disparity engine 164 may be the distance from the capture devices 102a-102n configured as a stereo pair. In an example, the disparity engine 164 may determine a distance from the capture devices 102a-102n configured as a stereo pair to a particular object (e.g., a vehicle, a bicycle, a pedestrian, driver, a vehicle occupant, etc.) based on the comparison of the differences in the stereo pair of images captured.

The look up table 170 may comprise reference information. In one example, the look up table 170 may allow the captured video data to be compared to and/or cross-referenced with some known set of data. In another example, the look up table 170 may allow the sensor fusion module 152 to compare and/or cross-reference data from the sensors 114 with some known sensor values (e.g., temperature, humidity, etc.). Generally, the look up table 170 may be implemented to index pre-calculated values to save computation time.

The data storage 172 may comprise various data types stored by the memory 108. In an example, the data storage 172 may correspond to detected objects, reference objects, a video file, status information (e.g., readings from the sensors 114) and/or metadata information. The types of data and/or the arrangement of data stored in the memory 108 may be varied according to the design criteria of a particular implementation.

The database storage 174 may comprise information about user preferences for one or more users of a vehicle. In an example, different drivers may have different driving behaviors (e.g., time of day the driver travels, the usual routes the driver travels, camera view preferences, etc.). The database storage 174 may be comprise information about particular conditions associated with selecting particular camera views for display. The type of data stored about each driver and/or vehicle occupant in the database storage 174 may be varied according to the design criteria of a particular implementation.

The database storage 174 may comprise information about detected events. The decision module 158 may determine whether an event has occurred based on information from the CNN module 150 and/or the sensor fusion module 152. An event may be a scenario determined by the decision module 158 to be worth storing information about (e.g., a collision, an unknown object detected, a near miss, etc.). The database storage 174 may store metadata corresponding to the detected event. The metadata may comprise a location, a time-of-day timestamp, detected weather conditions, speed of the vehicles, acceleration of the vehicles, etc.). In some embodiments, the metadata may comprise a log of all the measurements of the sensors 114.

In some embodiments, the database storage 174 may comprise information about particular individuals. In an example, the database storage 174 may comprise information about faces for one or more people. The facial information may be used to perform facial recognition to identify a passenger as a particular person. In an example, the facial information may comprise descriptors and/or features corresponding to one or more individuals (e.g., the vehicle owner and the family members of the vehicle owner). The facial information stored in the database 174 may be used to enable the apparatus 100 to perform specific actions for specific people.

In some embodiments, the video data generated by the processors 106a-106n may be a panoramic video. The video data may be communicated over a network via the communication devices 110. For example, the network may be a bandwidth-constrained network (e.g., a wireless network). The processors 106a-106n may combine hardware de-warping, intelligent video analytics and/or digital zooming. The processors 106a-106n may reduce wireless bandwidth consumption when communicating video data. The processors 106a-106n may increase image resolution within the available bandwidth.

In some embodiments, portions of the panoramic video may be cropped to the size of a particular one of the displays 118a-118n by the processors 106a-106n (e.g., portions of the panoramic video outside of the cropped portion may be discarded and/or not displayed). In some embodiments, the panoramic video may be panned in one or more directions to see additional portions of the panoramic video outside of the field of view of the displays 118a-118n. For example, the panoramic video may comprise a spherical video, a hemispherical video, a 360 degree video, a wide angle video, a video having less than a 360 field of view, etc. In some embodiments, the panoramic video may provide coverage for a full 360 degree field of view. In some embodiments, less than a 360 degree view may be captured by the panoramic video (e.g., a 270 degree field of view, a 180 degree field of view, etc.). In some embodiments, each of the lenses 112a-112n may be used to capture video frames that provide a portion of a field of view that may be stitched together to provide a field of view that is wider than the field of view captured by each individual one of the lenses 112a-112n. The processors 106a-106n may be configured to perform video stitching operations to stitch together video frames (e.g., arrange video frames according to position and/or time, reduce parallax effects, reduce distortions, etc.).

In some embodiments, the capture devices 102a-102n may implement a rolling shutter sensor. Using a rolling shutter sensor, a small amount of time difference may be present between some portions of each video frame. The processors 106a-106n may be configured to de-warp and/or correct a rolling shutter effect for each video frame.

In some embodiments, the apparatus 100 may further comprise an audio capture device (e.g., a microphone). The audio capture device may capture audio of the environment. The processors 106a-106n may be configured to synchronize the audio captured with the images captured by the capture devices 102a-102n.

The processors 106a-106n may generate output video data and/or video data that may be used internally within the processors 106a-106n. The signals VOUT_A-VOUT_N may be encoded, cropped, stitched and/or enhanced versions of one or more of the signals FRAMES_A-FRAMES_N. The signals VOUT_A-VOUT_N may be high resolution, digital, encoded, de-warped, stabilized, cropped, downscaled, packetized, blended, stitched and/or rolling shutter effect corrected versions of the signals FRAMES_A-FRAMES_N. The enhanced versions of the signals FRAMES_A-FRAMES_N may improve upon the view captured by the lenses 112a-112n (e.g., provide night vision, provide High Dynamic Range (HDR) imaging, provide more viewing area, highlight detected objects, provide additional information such as numerical distances to detected objects, provide bounding boxes for detected objects, etc.).

The processors 106a-106n may be configured to implement intelligent vision processors. The intelligent vision processors 106a-106n may implement multi-object classification. In one example, multi-object classification may comprise detecting multiple objects in the same video frames using parallel processing that reduces power consumption and/or computational resources compared to detecting multiple objects one object at a time. The multi-object classification may further comprise determining multiple inferences at a time (e.g., compared to first detecting whether an object exists, then detecting that the object is a driver, then determining whether the driving is holding the steering wheel, etc.).

The processor 106n is shown comprising a number of blocks (or circuits) 180a-180n. While the blocks 180a-180n are shown on the processor 106n, each of the processors 106a-106n may implement one or more of the blocks 180a-180n. The blocks 180a-180n may implement various hardware modules implemented by the processors 106a-106n. The hardware modules 180a-180n may be configured to provide various hardware components that may be used by the processors 106a-106n to efficiently perform various operations. Various implementations of the processors 106a-106n may not necessarily utilize all the features of the hardware modules 180a-180n. In one example, the hardware modules 180a-180n may be configured to implement various security features (e.g., secure boot, I/O virtualization, etc.). The features and/or functionality of the hardware modules 180a-180n may be varied according to the design criteria of a particular implementation. Details of the hardware modules 180a-180n may be described in association with U.S. patent application Ser. No. 16/831,549, filed on Apr. 16, 2020, U.S. patent application Ser. No. 16/288,922, filed on Feb. 28, 2019 and U.S. patent application Ser. No. 15/593,493 (now U.S. Pat. No. 10,437,600), filed on May 12, 2017, appropriate portions of which are hereby incorporated by reference in their entirety.

The hardware modules 180a-180n may be implemented as dedicated hardware modules. Implementing various functionality of the processors 106a-106n using the dedicated hardware modules 180a-180n may enable the processors 106a-106n to be highly optimized and/or customized to limit power consumption, reduce heat generation and/or increase processing speed compared to software implementations. The hardware modules 180a-180n may be customizable and/or programmable to implement multiple types of operations. Implementing the dedicated hardware modules 180a-180n may enable the hardware used to perform each type of calculation to be optimized for speed and/or efficiency. For example, the hardware modules 180a-180n may implement a number of relatively simple operations that are used frequently in computer vision operations that, together, may enable the computer vision algorithm to be performed in real-time. The processors 106a-106n may be configured to recognize objects. Objects may be recognized by interpreting numerical and/or symbolic information to determine that the visual data represents a particular type of object and/or feature. For example, the number of pixels and/or the colors of the pixels of the video data may be used to recognize portions of the video data as objects.

One of the hardware modules 180a-180n (e.g., 180a) may implement a scheduler circuit. The scheduler circuit 180a may be configured to store a directed acyclic graph (DAG). In an example, the scheduler circuit 180a may be configured to generate and store the directed acyclic graph in response to the feature set information. The directed acyclic graph may define the video operations to perform for extracting the data from the video frames. For example, the directed acyclic graph may define various mathematical weighting to apply when performing computer vision operations to classify various groups of pixels as particular objects.

The scheduler circuit 180a may be configured to parse the acyclic graph to generate various operators. The operators may be scheduled by the scheduler circuit 180a in one or more of the other hardware modules 180a-180n. For example, one or more of the hardware modules 180a-180n may implement hardware engines configured to perform specific tasks (e.g., hardware engines designed to perform particular mathematical operations that are repeatedly used to perform computer vision operations). The scheduler circuit 180a may schedule the operators based on when the operators may be ready to be processed by the hardware engines 180a-180n.

The scheduler circuit 180a may time multiplex the tasks to the hardware modules 180a-180n based on the availability of the hardware modules 180a-180n to perform the work. The scheduler circuit 180a may parse the directed acyclic graph into one or more data flows. Each data flow may include one or more operators. Once the directed acyclic graph is parsed, the scheduler circuit 180a may allocate the data flows/operators to the hardware engines 180a-180n and send the relevant operator configuration information to start the operators.

Each directed acyclic graph binary representation may be an ordered traversal of a directed acyclic graph with descriptors and operators interleaved based on data dependencies. The descriptors generally provide registers that link data buffers to specific operands in dependent operators. In various embodiments, an operator may not appear in the directed acyclic graph representation until all dependent descriptors are declared for the operands.

One of the hardware modules 180a-180n and/or the CNN module 150 may implement an artificial neural network (ANN) module. The artificial neural network module may be implemented as a fully connected neural network or a convolutional neural network (CNN). In an example, fully connected networks are "structure agnostic" in that there are no special assumptions that need to be made about an input. A fully-connected neural network comprises a series of fully-connected layers that connect every neuron (or node) in one layer to every neuron (or node) in the other layer. In a fully-connected layer, for n inputs and m outputs, there are n*m weights. There may also be a bias value for each output neuron (or node), resulting in a total of (n+1)*m parameters. An activation function may also be implemented. The activation function may convert an output from the nodes of one layer into an input for the nodes of a next layer. The activation function may provide constraints to the output of a node (e.g., prevent computational issues caused by large values). The activation function may provide non-linearity to the neural network. The non-linearity provided by the activation function may enable classifications of patterns with a high degree of complexity (e.g., highly complex patterns for computer vision). In one example, the activation function may implement a ReLU function.

In an already-trained neural network, the (n+1)*m parameters have already been determined during a training process. An already-trained neural network generally comprises an architecture specification and the set of parameters (weights and biases) determined during the training process. In another example, CNN architectures may make explicit assumptions that the inputs are images to enable encoding particular properties into a model architecture. The CNN architecture may comprise a sequence of layers with each layer transforming one volume of activations to another through a differentiable function.

One or more of the dedicated hardware modules 180a-180n may be configured to extract feature points from the video frames. The CNN module 150 may be configured to analyze pixels of the video frames and/or groups of pixels of the video frame. One or more of the dedicated hardware modules 180a-180n may be configured to perform particular mathematical operations that may be performed multiple times to perform the analysis of the pixels and/or groups of pixels. The operations performed by the dedicated hardware modules 180a-180n may be configured to calculate descriptors based on the feature points. The dedicated hardware modules 180a-180n may be configured to compare the descriptors to reference descriptors stored in the memory 108 to determine whether the pixels of the video frames correspond to a particular object.

Figure 2:
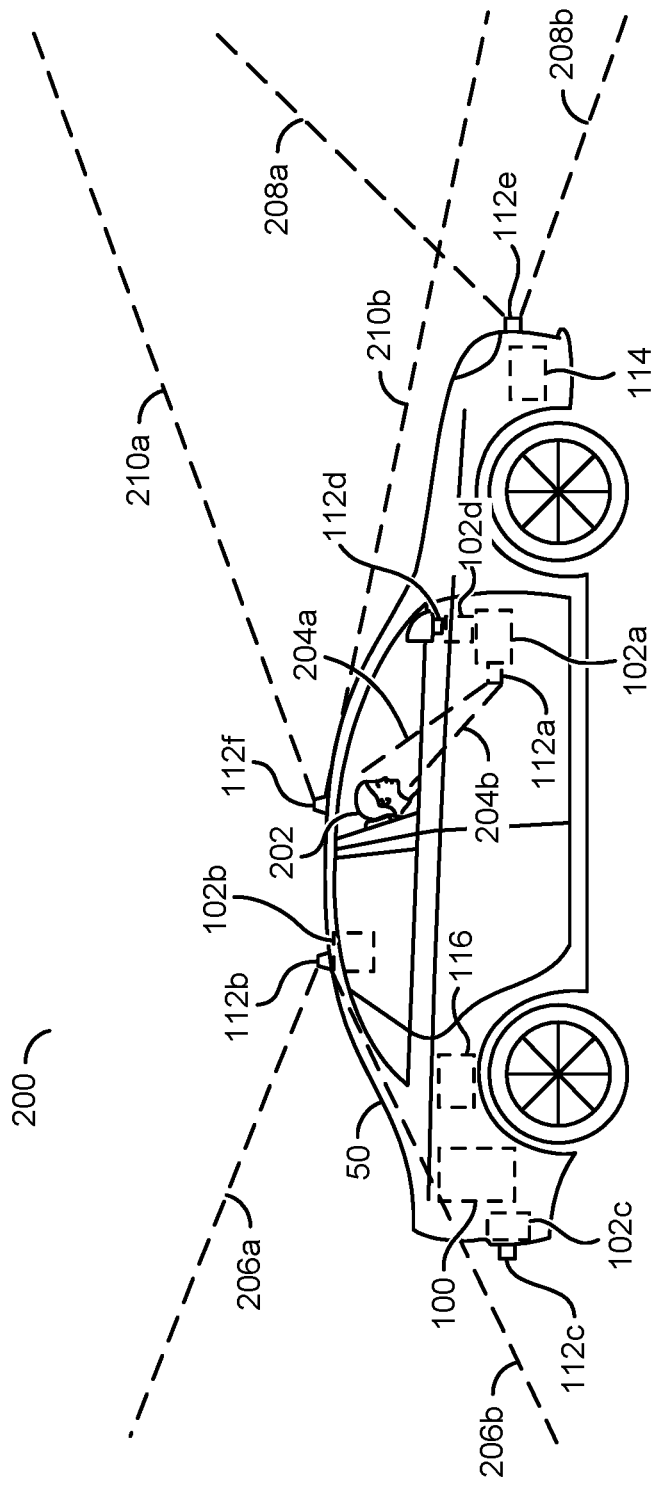
FIG. 2 is a diagram illustrating an example of camera systems inside and outside of a vehicle.

Referring to FIG. 2, a diagram illustrating an example embodiment 200 of camera systems inside and outside of a vehicle is shown. An automobile/vehicle 50 is shown. The apparatus 100 is shown as a component of the vehicle 50 (e.g., an ego vehicle). In the example shown, the ego vehicle 50 is a car. In some embodiments, the ego vehicle 50 may be a truck, an ATV, an airplane, a drone, etc. The type of the ego vehicle 50 implementing the apparatus 100 may be varied according to the design criteria of a particular implementation.

A driver 202 is shown seated in the ego vehicle 50. The vehicle sensors 114 are shown on (or in) the ego vehicle 50. The apparatus 100 is shown in the rear of the ego vehicle 50. In another example, the apparatus 100 may be distributed throughout the ego vehicle 50 (e.g., connections may be implemented between the apparatus 100 and the capture devices 102a-102d and/or sensors 114 such as a direct wired connection and/or a connection using a common bus line). A location of the apparatus 100 may be varied according to the design criteria of a particular implementation.

A camera (e.g., the lens 112a and the capture device 102a) is shown capturing an interior of the ego vehicle 50 (e.g., detecting the driver 202). A targeted view of the driver 202 (e.g., represented by a line 204a and a line 204b) is shown being captured by the capture device 102a. The capture device 102a may also detect other objects in the ego vehicle 50 (e.g., a seat, a head rest, an arm rest, a rear window, a seatbelt, a center console, other occupants, etc.). By analyzing video of the driver 202 and/or other occupants of the ego vehicle 50 (e.g., extracting video data from the captured video), the processors 106a-106n may determine a body position and/or body characteristics (e.g., a distance, orientation and/or location of the body and/or head) of one or more occupants of the ego vehicle 50 and/or objects within the ego vehicle 50.

In some embodiments, more than one of the capture devices 102a-102n may be used to capture video data of the driver 202 and/or other occupants of the ego vehicle 50. A combination of inputs from the signals FRAMES_A-FRAMES_N may be used to detect changes in head/face movements and/or body positions. For example, using multiple cameras (e.g., stereo cameras) may improve the accuracy of depth information. The number of cameras used and/or the type of data extracted from the video data from the driver monitoring cameras may be varied according to the design criteria of a particular implementation.

A camera (e.g., a combination of the lens 112c and the capture device 102c) is shown capturing a targeted view from the ego vehicle 50. In the example shown, the targeted view from the ego vehicle 50 (e.g., represented by a line 206a and a line 206b) is shown capturing an exterior view to the rear of (e.g., an area behind) the ego vehicle 50. Similarly, other cameras may be used to capture video data of a targeted view from the vehicle (e.g., shown as the lens 112c and the capture device 102c, the lens 112d and the capture device 102d, etc.). For example, the targeted view (e.g., represented by a line 208a and a line 208b captured by the lens 112e) may provide a front exterior view of an area. In another example, a redundant targeted view (e.g., represented by a line 210a and a line 210b captured by the lens 112f) may provide an alternate front exterior view of an area. Redundant targeted views (e.g., targeted views that generally cover the same area) may provide a failover system and/or provide a secondary data set. The number of cameras implemented, a direction captured, an orientation of the cameras and/or an arrangement of the cameras may be varied according to the design criteria of a particular implementation.

The capture devices 102a-102n may be configured to capture video data of the environment around (e.g., area near) the ego vehicle 50. The processors 106a-106n may implement computer vision to detect objects and/or understand what is happening near the ego vehicle 50 (e.g., see the environment as a human driver would see the environment). The sensors 114 may be implemented using proximity detection technology. For example, the vehicle sensors 114 may implement a radar device, an array of radars, a sonar device, an array of sonars, a lidar device, an array of lidar devices, an ultra-sound device, an array of ultra-sound devices, etc.

The sensor fusion module 152 may aggregate data from the sensors 114, the CNN module 150 and/or the video pipeline 156 to build a model and/or abstraction of the environment around the ego vehicle 50. The computer vision operations may enable the processors 106a-106n to understand the environment, a state of objects, relative positions of objects and/or a meaning of objects to derive inferences (e.g., detect that the state of a streetlight is red, detect that a street sign indicates the ego vehicle 50 should stop, understand that a pedestrian is walking across the street from right to left, understand that brake lights of a vehicle ahead indicate that the vehicle is slowing down, etc.). The sensor fusion module 152 may enable a comparison and/or cross-reference of the data received from the vehicle sensors 114 at a particular time to the video data captured at another particular time in order to adjust a confidence level of an inference. The type of inferences made by the processors 106a-106n may be varied according to the design criteria of a particular implementation.

The processors 106a-106n may be configured to analyze the captured video signal. The processors 106a-106n may detect objects in the captured video signal of the exterior of a vehicle (e.g., automobiles, bicycles, pedestrians, animals, parking spaces, etc.) and/or of an interior of a vehicle (e.g., the driver 202, other occupants, physical characteristics of people in the vehicle, facial expressions of people in the vehicle, fields of view of the people in the vehicle, etc.). The processors 106a-106n may be configured to determine a presence, an absolute location and/or a relative location of the detected objects. Based on the detected objects, the processors 106a-106n may determine a position (e.g., a distance) of the objects relative to the vehicle and/or a position of the objects relative to a component of the vehicle (e.g., distance from a vehicle pillar, distance from a steering wheel, distance from a dashboard, distance from another seat, etc.).

The decision making module 158 may make a decision based on data received at various inputs and/or various data inferred by the processors 106a-106n. For example, the data received may comprise external signals generated in response to user input, external signals generated by the sensors 114 and/or internally generated signals such as signals generated by the processors 106a-106n in response to analysis of the video data and/or objects detected in video data.

The processors 106a-106n may process video data that may not be seen by a person (e.g., not output to the displays 118a-118n). For example, the video data may be internal to the processors 106a-106n. Generally, the processors 106a-106n perform the computer vision operations in order to interpret the environment to emulate how a person would see the environment and/or provide greater sensory capability than a human. For example, the processors 106a-106n may interpret the environment in many directions at once (e.g., a 360 degree field of view) while a person has a limited field of view.

The video analytics performed by the processors 106a-106n may be performed on more than one video frame. For example, the processors 106a-106n may analyze a series (or sequence) of video frames. In some embodiment, the processors 106a-106n may be configured to generate motion vectors to track the movement of objects across video frames temporally. The motion vectors may indicate a direction and/or speed of movement of an object between a current video frame and previous video frames. Tracking movements of objects may enable determining gestures (e.g., to receive input commands), determine a vulnerability of an occupant (e.g., a non-moving occupant may be asleep and/or unconscious) and/or determine an expected path of a detected object (e.g., determine speed, acceleration and direction to determine a trajectory). The expected path may be further determined based on context such the type of object and/or the shape of the roadway (e.g., a vehicle with a straight trajectory will likely follow the curve of a roadway instead of continuing to drive straight off the road). In another example, tracking a static object across video frames temporally may be implemented to determine a status of an object. For example, the windshield may be tracked over time to determine that visibility has been reduced and/or increased (e.g., due to frost forming and/or disappearing).

In some embodiments, the processors 106a-106n may implement depth-sensing techniques. The depth-sensing techniques may compare knowledge of the dimensions of the ego vehicle 50 to the location and/or body position of the occupants. The processors 106a-106n may cross-reference a body position of the occupants with a location of the components of the vehicle (e.g., how far away the driver is from the steering wheel).

In some embodiments, the video analytics may process the captured video frames for biometric markers to determine a vulnerability of the occupants of the ego vehicle 50. For example, one or more of age, height and/or weight may be the determined biometric markers. The biometric markers may be used to differentiate between a child, an adolescent, a pregnant woman, a young adult, teenager, adult, etc. Feature maps may be detected and/or extracted while the video data is processed in the pipeline module 156 to generate inferences about body characteristics to determine age, gender, and/or condition (e.g., wrinkles, facial structure, bloodshot eyes, eyelids, signs of exhaustion, etc.).

The processors 106a-106n may be configured to detect faces in a region of a video frame. In some embodiments, facial recognition may be implemented (e.g., based on faces stored as references in the memory 108 and/or an external database accessible by the communication devices 110). In some embodiments, the processors 106a-106n may be configured to detect objects and classify the objects as a particular type of object (e.g., an elderly person, a child, an animal, etc.).

The processors 106a-106n may implement a "diagnosis" and/or a confidence level for recognizing and/or classifying the objects. In some embodiments, the sensor fusion module 152 may be used to combine information from the sensors 114 to adjust the confidence level (e.g., using a weight sensor in the seat to confirm that the weight of the object is consistent with a person, using temperature sensor readings to confirm that body heat is detected, using seat position preferences to confirm a known occupant, comparing a determined object location exterior to the vehicle with V2X information, etc.).

The processors 106a-106n may determine a type of the detected objects based on a classification. The classification may be based on information extracted from the video data and/or information from the sensors 114 (e.g., environmental factors). For example, the color histogram, the high frequency component and/or video analytics of the video data may be compared to some known reference. In another example, temperature and/or humidity information may be provided by the sensors 114 (e.g., to distinguish a cold person from a hot person). The processors 106a-106n may rule out and/or increase a likelihood of certain types of objects. For example, the classification may comprise a confidence level for a particular hypothesis (or diagnosis) about the condition (e.g., capability) of the detected objects. When the confidence level is above a pre-determined threshold value, the classification may be considered to be confirmed by the processors 106a-106n.

A high confidence level for a particular type of object may indicate that evidence is consistent with the particular type of object. A low confidence level for a particular type of object may indicate that evidence is inconsistent with the particular type of object and/or not enough evidence is available yet. Various checks may be performed to determine the confidence level. The implementation of the classification and/or confidence level to determine the type of object may be varied based on the design criteria of a particular implementation.

The computer vision operations may be one type of video analysis performed by the processors 106a-106n. The processors 106a-106n may be configured to determine a current size, shape and/or color of the objects (e.g., to perform a classification). One or more of the objects may be detected in each video frame. The processors 106a-106n may determine a number of pixels (e.g., a width, a height and/or a depth) comprising the detected objects in each video frame portion of a video frame and/or region of a video frame. Based on the number of pixels of each of the detected objects in the video frame, the processors 106a-106n may estimate a classification of the detected objects and/or adjust the confidence level.

The computer vision operations may be performed on video frames received from the various capture devices 102a-102n. The capture devices 102a-102n may comprise various types of cameras (e.g., IR, depth measuring cameras such as stereo, time-of-flight and/or structured light cameras, Bayer cameras, RCCB, RCCC, etc.). The computer vision operations may be performed on the video frames FRAMES_A-FRAMES_N generated by various configurations of the capture devices 102a-102n. In one example, the computer vision operations may be performed based on video frames captured by a single camera. In another example, the computer vision operations may be performed based on video frames captured by multiple cameras configured to capture images of different locations. The sensor fusion module 152 may enable the computer vision operations to be supplemented by the user of the sensors 114 (e.g., radar, occupancy sensors, temperature sensors, location/orientation sensors, etc.). The type of capture devices implemented may be varied according to the design criteria of a particular implementation.

The memory 108 may store the pre-determined locations and/or a pre-determined field of view of each of the capture devices 102a-102n. The memory 108 may store reference data corresponding to the objects. For example, the memory 108 may store reference color histograms about various known types of objects. In another example, the memory 108 may store previously captured frames (e.g., a reference image from when the ego vehicle 50 was parked, when the ego vehicle 50 came out of production, a reference image from when a car was in operation, turned off, left unattended, etc.). The type of reference information stored by the memory 108 may be varied according to the design criteria of a particular implementation.

The CNN module 150 may be configured to "train" the processors 106a-106n to know (e.g., store in the memory 108) the objects and/or expected locations (or areas) that the objects may detect in a video frame. The video analytics performed by the processors 106a-106n may determine whether the detected objects are exterior to or interior to the ego vehicle 50. The processors 106a-106n may be configured to respond differently to different types of objects. For example, if the classified object is a person, the processors 106a-106n may be further configured to estimate the age of the person via video analytics. For example, the video analytics may be configured to tell the difference between a small child (or incapacitated person), an elderly person and/or an able-bodied adult.

The video analytics may be configured to determine reference objects. For example, the CNN module 150 may be trained to recognize when a car seat is empty. In another example, the CNN module 150 may be configured to recognize when a child, person, pet and/or a type of inanimate object is present in the seat. Comparing the seat in the current video frame to a reference empty seat may enable the processors 106a-106n to detect the presence of occupants even if there is no motion by the occupants.

The processors 106a-106n may determine the width of the reference objects (e.g., based on the number of pixels occupied in the video frame). The memory 108 may store (e.g., in the look up table 170) the width of the reference objects. The processors 106a-106n may determine the width of the reference objects (e.g., the number of pixels in the video frame). The width of the current size of the reference object may be compared to the stored width of the reference object to estimate a distance of the occupants of the ego vehicle 50 from the lens 112a-112n. For example, a number of pixels may be measured between the reference object and the head of the driver 202 to determine location coordinates of the head of the driver 202.

In some embodiments, the processors 106a-106n may determine the position (e.g., 3D coordinates and/or location coordinates) of various features (e.g., body characteristics) of the occupants of the ego vehicle 50. In one example, the location of the arms, legs, chest and/or eyes may be determined using 3D coordinates. One location coordinate on a first axis for a vertical location of the body part in 3D space and another coordinate on a second axis for a horizontal location of the body part in 3D space may be stored. In some embodiments, the distance from the lenses 112a-112n may represent one coordinate (e.g., a location coordinate on a third axis) for a depth location of the body part in 3D space. Using the location of various body parts in 3D space, the processors 106a-106n may determine body position, body characteristics and/or the vulnerability of the occupants.

In some embodiments, the processors 106a-106n may be configured to approximate the gaze of the driver 202. For example, the drowsiness and/or attentiveness of the driver 202 may be detected (e.g., recognizing that eyes are closing, recognizing that the head is drifting down, etc.). In another example, the processors 106a-106n may present the recording of the driver 202 to one of the displays 118a-118n (e.g., as a live stream for use in teleconferencing). The processors 106a-106n may be configured to recognize the driver 202 through facial recognition.

The memory 108 (e.g., the look up table 170) may store a reference size (e.g., the number of pixels of a particular reference object in a video frame at a known distance) of particular objects. In another example, the memory 108 may store a reference shape (e.g., an arrangement of pixels of the reference object in the video frame at a known distance). In yet another example, the memory 108 may store a reference color (e.g., a RGB value and/or a YCbCr value for each of the pixels of the reference object in the video frames). The processor 106a-106n may compare the shape, size and/or colors of the reference object to detected objects in the current video frame. The comparison of the size, shape and/or color of the detected objects in the current video frame and the reference size may be used to determine the location coordinates, rotation, orientation and/or movement direction of the objects.

In some embodiments, the lenses 112a-112n and/or the capture devices 102a-102n may be configured to implement stereo vision. For example, the lenses 112a-112n and/or the capture devices 102a-102n may be arranged to capture multiple perspectives of a location. Using the multiple perspectives, the processors 106a-106n may generate a depth map. The depth map generated by the processors 106a-106n may be used to estimate depth, provide 3D sensing and/or provide an immersive field of view with a 3D effect (e.g., a spherical field of view, an immersive field of view, a 360 degree field of view, less than a 360 degree field of view, etc.).

In some embodiments, the processors 106a-106n may analyze reference video frames. Reference video frames may be used by the processors 106a-106n to classify, analyze and/or store reference objects. The reference objects may be used by the processors 106a-106n to compare with objects captured in newly acquired (e.g., current) video frames. The reference objects may be used to provide objects having known characteristics such as sizes, shapes, colors, feature maps, edges, color histograms, contrasts, orientations, etc. The characteristics of the reference objects may be used as a comparison point for detecting, recognizing and/or classifying objects in the computer vision operations. In one example, a distance to an object may be determined by comparing a number of pixels occupied by a particular object in the reference frame to the number of pixels occupied by the object in the current video frame. The types of reference objects and/or characteristics of the reference objects may be varied according to the design criteria of a particular implementation.

In some embodiments, the processors 106a-106n may compare the current video frame to the reference video frame. In some embodiments, the current video frame may not be directly compared to the reference video frame. For example, the CNN module 150 may implement deep learning to gather information and/or statistics about various features of objects. The CNN module 150 may determine features of objects and/or sub-objects corresponding to the current video frame. The processors 106a-106n may compare the features extracted from the current video frame to features extracted from numerous reference video frames. For example, the reference video frame and/or the current video frame may be used as training data for the CNN module 150. The types of features extracted from video frames to perform the computer vision analysis may be varied according to the design criteria of a particular implementation.

Figure 3:
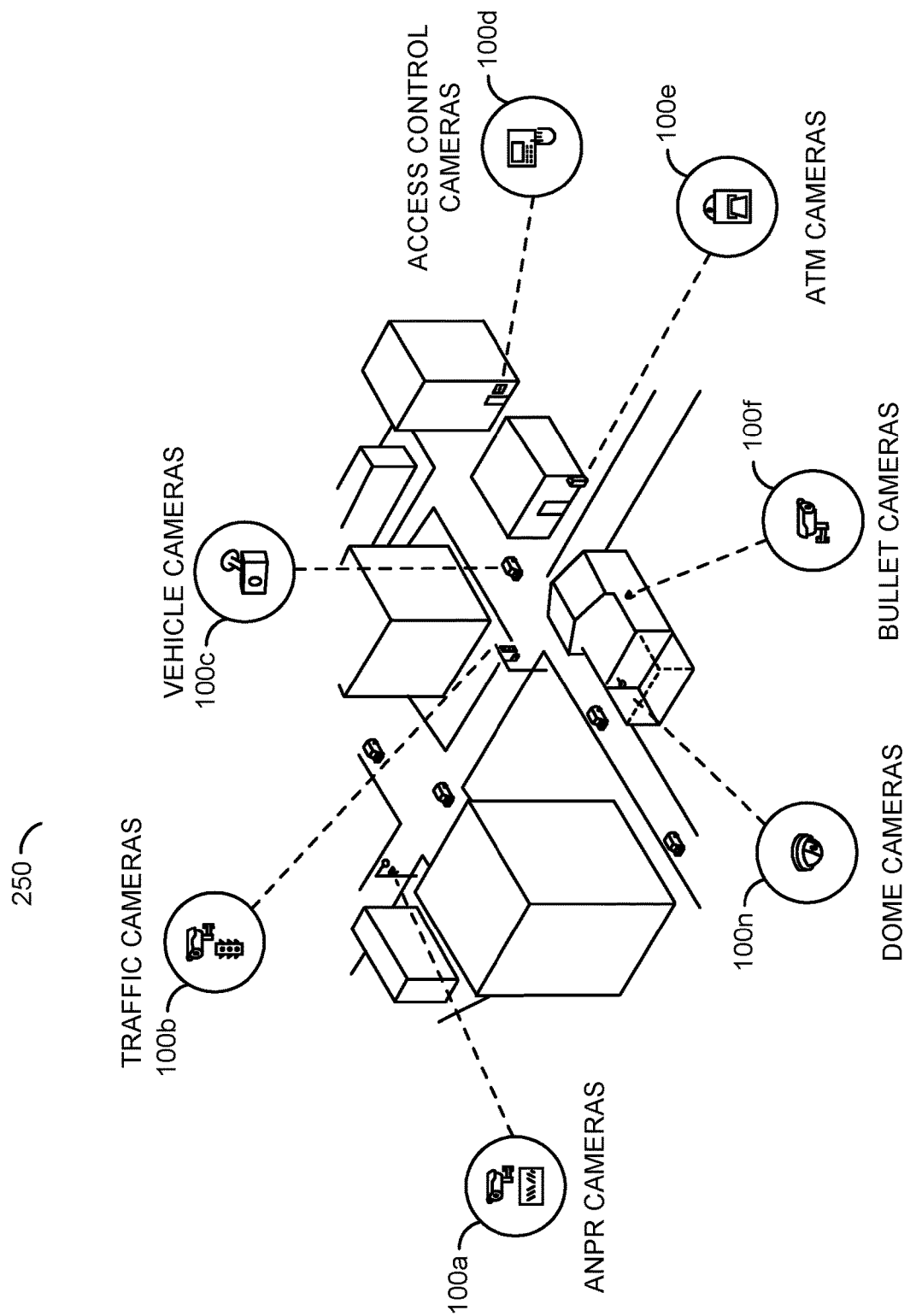
FIG. 3 is a diagram illustrating examples of edge devices that may utilize a processor configured to implement video correctness checking in accordance with example embodiments of the invention.

Referring to FIG. 3, a diagram illustrating examples of edge devices that may utilize a processor configured to implement video correctness checking in accordance with example embodiments of the invention is shown. An over-head view of an area 250 is shown. In the example shown, the area 250 may be an outdoor location. Streets, vehicles and buildings are shown.

Devices 100a-100n are shown at various locations in the area 250. The devices 100a-100n may each implement an edge device. The edge devices 100a-100n may comprise smart IP cameras (e.g., camera systems). The edge devices 100a-100n may comprise low power technology designed to be deployed in embedded platforms at the edge of a network (e.g., microprocessors running on sensors, cameras, or other battery-powered devices), where power consumption is a critical concern. In an example, the edge devices 100a-100n may comprise various traffic cameras and intelligent transportation systems (ITS) solutions.

The edge devices 100a-100n may be implemented for various applications. In the example shown, the edge devices 100a-100n may comprise automated number plate recognition (ANPR) cameras 100a, traffic cameras 100b, vehicle cameras 100c, access control cameras 100d, automatic teller machine (ATM) cameras 100e, bullet cameras 100f, dome cameras 100n, etc. In an example, the edge devices 100a-100n may be implemented as traffic cameras and intelligent transportation systems (ITS) solutions designed to enhance roadway security with a combination of person and vehicle detection, vehicle make/model recognition, and automatic number plate recognition (ANPR) capabilities.

In the example shown, the area 250 may be an outdoor location. In some embodiments, the edge devices 100a-100n may be implemented at various indoor locations. In an example, edge devices 100a-100n may incorporate a convolutional neural network in order to be utilized in security (surveillance) applications and/or access control applications. In an example, the edge devices 100a-100n implemented as security camera and access control applications may comprise battery-powered cameras, doorbell cameras, outdoor cameras, indoor cameras, etc. The security camera and access control applications may realize performance benefits from application of a convolutional neural network in accordance with embodiments of the invention. In an example, an edge device utilizing a convolutional neural network in accordance with an embodiment of the invention may take massive amounts of image data and make on-device inferences to obtain useful information (e.g., multiple time instances of images per network execution) with reduced bandwidth and/or reduced power consumption. The design, type and/or application performed by the edge devices 100a-100n may be varied according to the design criteria of a particular implementation.

The video correctness checking may provide accurate input that may be used for object detection. For example, the edge devices 100a-100n may implement the convolutional neural network to perform object detection on video data captured. Decisions may be made based on the object detection performed. In one example, the object detection may be used for liveness detection. In another example, the object detection may be used to enable a security alarm. Providing video frames that are determined to be reliable due to video correctness checking may ensure that the object detection is accurate (and the decisions made in response to the objects detected are based on correct information). The video correctness checking may further provide accurate input for video encoding (e.g., for output to an attached display, for long term storage, for communication to an external device, etc.). The video correctness checking may provide accurate input for depth map generation and/or 3D reconstruction. The types of operations performed in response to analyzing the video data determined to be correct may be varied according to the design criteria of a particular implementation.

Each camera device 100a-100n may have a different style and/or use case. For example, the camera 100a may be an action camera, the camera 100n may be a ceiling mounted security camera, the camera 100i may be a webcam, etc. Other types of cameras may be implemented (e.g., home security cameras, battery powered cameras, doorbell cameras, stereo cameras, etc.). In some embodiments, the camera devices 100a-100n may implement a structured light projector. The design/style of the cameras 100a-100n may be varied according to the design criteria of a particular implementation.

The cameras 100a-100n may be edge devices. The video processor implemented by each of the cameras 100a-100n may enable the cameras 100a-100n to implement various functionality internally (e.g., at a local level). For example, the cameras 100a-100n may be configured to locally perform object/event detection (e.g., computer vision operations), 3D reconstruction, liveness detection, depth map generation, video encoding and/or video transcoding on-device. For example, even advanced processes such as computer vision and 3D reconstruction may be performed by the processor without uploading video data to a cloud service in order to offload computation-heavy functions (e.g., computer vision, video encoding, video transcoding, etc.).

In some embodiments, multiple camera systems may be implemented (e.g., camera systems 100a-100n may operate independently from each other). For example, each of the cameras 100a-100n may individually analyze the pixel data captured and perform the event/object detection locally (e.g., on device). In some embodiments, the cameras 100a-100n may be configured as a network of cameras (e.g., security cameras that send video data to a central source such as network-attached storage and/or a cloud service). The locations and/or configurations of the cameras 100a-100n may be varied according to the design criteria of a particular implementation.

In some embodiments, the camera systems 100a-100n may be implemented in an automotive system, as shown in association with FIG. 2. Providing efficient video correctness checking in real-time while limiting power consumption may be useful for an automotive application (e.g., a battery powered vehicle with a limited power supply). Automotive applications may rely on object detection for various safety features, which may demand a high level of safety checking. The video correctness checking may ensure the decisions made based on the object detection are based on accurate input. In some embodiments, the camera systems 100a-10n may be implemented in security applications. Implementing the video correctness checking may prevent from key video damage.

Figure 4:
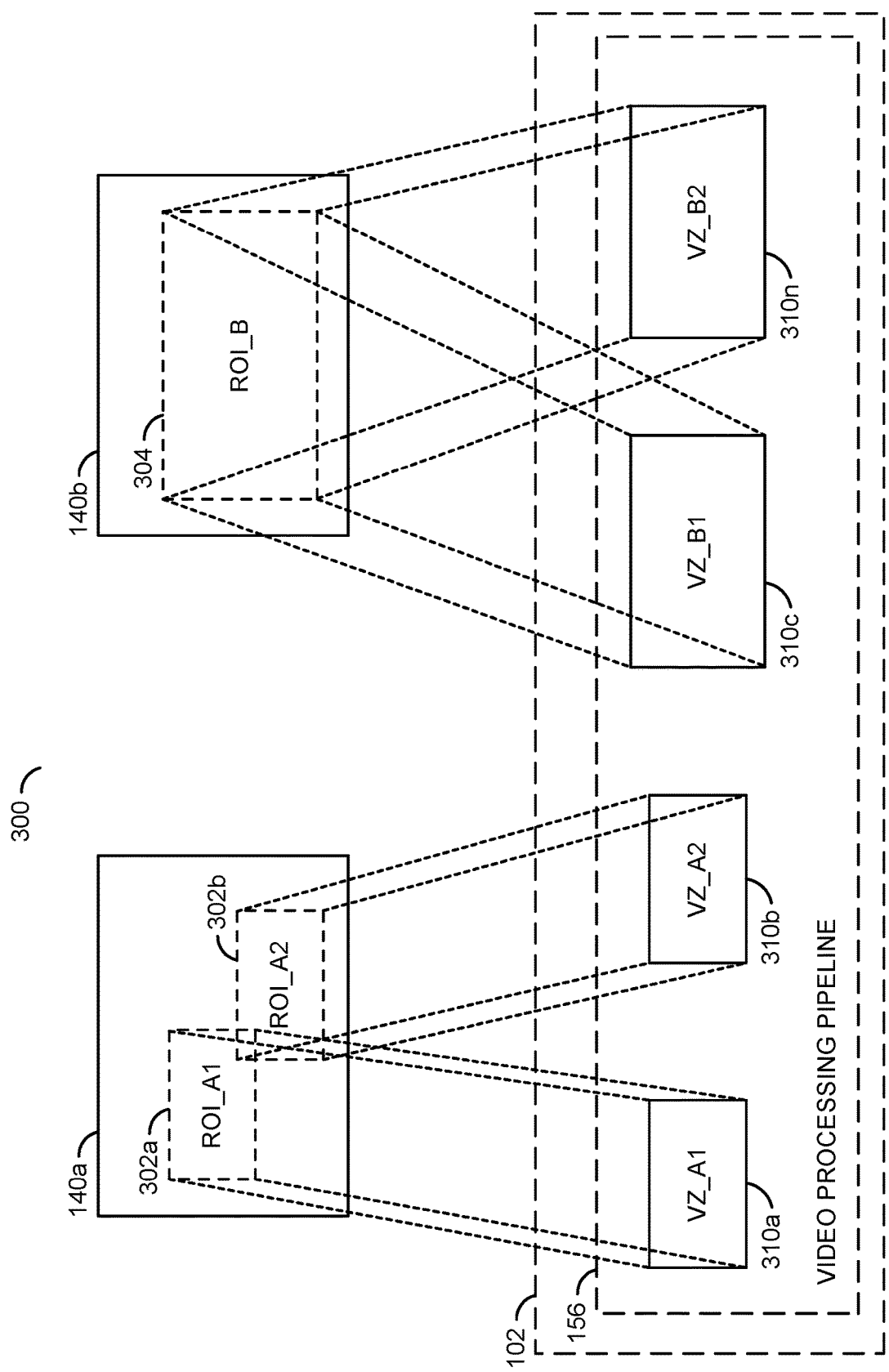
FIG. 4 is a diagram illustrating a hardware pipeline configured to capture and process multiple view zones in parallel.

Referring to FIG. 4, a diagram illustrating a hardware pipeline configured to capture and process multiple view zones in parallel is shown. An example hardware architecture 300 is shown. The example hardware architecture 300 may comprise the processor 106i and the image sensors 140a-140b. The processor 106i is shown as a representative example of the processors 106a-106n. For example, each of the processors 106a-106n may have a similar implementation as the example processor 106i. The video processing pipeline 156 is shown as a component of the processor 106i.

The image sensors 140a-140b are shown presenting pixel data to the processor 106i (e.g., the signal FRAMES_A-FRAMES_B). The image sensors 140a-140b may be a component of the respective capture devices 102a-102b. The two image sensors 140a-140b are shown as a representative example of the image sensors 140a-140n implemented by the respective capture devices 102a-102n. While the two image sensors 140a-140b are shown, the processor 106i may receive pixel data from one or more of the capture devices 102a-102n. The number of the image sensors 140a-140n read by any one of the processors 106a-106n may be varied according to the design criteria of a particular implementation.

The image sensor 140a is shown comprising a number of dotted boxes 302a-302b. The dotted boxes 302a-302b may illustrate regions of interest of the image sensor 140a. For example, the region of interest 302a may be ROI_A1 and the region of interest 302b may be ROI_A2. The regions of interest 302a-302b may comprise sub-portions of an exposure area of the image sensor 140a. For example, the image sensor 140a may receive light input that may be exposed on the lines of the image sensor 140a that may be read out by the logic 142a as raw pixel data. In the example shown, there may be two regions of interest 302a-302b for the image sensor 140a that may be approximately the same size. In the example shown, the regions of interest 302a-302b may partially overlap. In some embodiments, there may be more or fewer than the two regions of interest 302a-302b. In some embodiments, more or less or none of the area of the regions of interest 302a-302b may overlap. The size, location, aspect ratio, amount of overlap and/or the number of the regions of interest 302a-302b may be varied according to the design criteria of a particular implementation.

The image sensor 140b is shown comprising a dotted box 304. The dotted box 304 may illustrate a region of interest of the image sensor 140b. For example, the region of interest 304 may be ROI_B. The region of interest 304 of the image sensor 140b may be similar to the regions of interest 302a-302b of the image sensor 140a. In the example shown, the image sensor 140b may have a single region of interest that is larger than the each of the regions of interest 302a-302b of the image sensor 140a. The regions of interest of each of the image sensors 140a-140n may be the same size, location, aspect ratio, etc. or have different sizes, locations, aspect ratios, etc. In some embodiments, the processors 106a-106n may adjust and/or select the particular regions of interest of the various image sensors 140a-140n (e.g., via the signals CONTROL_A-CONTROL_N).

The pixel data from the regions of interest 302a-302b of the image sensor 140a and/or the region of interest 304 of the image sensor 140b may be communicated from the capture devices 102a-102b to the processor 106i. In an example, the signals FRAMES_A-FRAMES_B may communicate the pixel data from the regions of interest 302a-302b and/or the region of interest 304 to the processor 106i. The pixel data may be processed by the video processing pipeline 156.

The video processing pipeline 156 may receive the pixel data. The video processing pipeline 156 may be configured to process the pixel data arranged as video frames. The video processing pipeline 156 is shown comprising a number of blocks (or circuits) 310a-310n. The blocks 310a-310n may comprise view zones. The view zones 310a-310n may enable pixel data and/or image data to process and/or output multiple images in parallel. The view zones 310a-310n may enable the parallel operations without adding (e.g., providing duplicate) hardware or software resources. The view zones 310a-310n may comprise multiple hardware paths implemented by the hardware engines 180a-180n in the video processing pipeline 156. The view zones 310a-310n may comprise an on-chip memory (e.g., a cache) for the pixel data. Details of the hardware engines 180a-180n may be described in association with U.S. patent application Ser. No. 17/479,034, filed on Sep. 20, 2021 and U.S. patent application Ser. No. 17/509,666, filed on Oct. 25, 2021, appropriate portions of which are incorporated by reference. The number of view zones 310a-310n implemented by the video processing pipeline 156 may be varied according to the design criteria of a particular implementation.

Each of the view zones 310a-310n may define a size and/or position on the sensors 140a-140n individually. The video processing may be performed on the view zones 310a-310n in parallel. The view zones 310a-310n may output the pixel data as video frames. By selecting different video processing settings for the various view zones 310a-310n, the processors 106a-106n may output different sizes of video frames and/or arrangements of pixel data from the view zones 310a-310n and perform the video correctness checking.

In the example shown, the pixel data from the region of interest 302a may correspond to the view zone 310a (e.g., VZ_A1) and the pixel data from the region of interest 302b may correspond to the view zone 310b (e.g., VZ_A2). In the example shown, the pixel data from the region of interest 304 may correspond to both the view zone 310c (e.g., VZ_B1) and the view zone 310n (e.g., VZ_B2). The video processing pipeline 156 may be configured to crop, upscale and/or downscale the pixel data received in each of the view zones 310a-310n. For example, the amount of pixel data in each of the view zones 310a-310n may be different based on the settings selected by the processor 106i and/or input provided by an end user.

To perform the video correctness check, the processor 106i may compare an output image to a similar image. The output image and the similar image may be captured from the same source. In the example shown, the image sensor 140b may comprise the region of interest 304 that provides pixel data for the view zone 310c and the view zone 310n. For example, the view zone 310c and the view zone 310n may have the same cropped size and position of the region of interest 304. The video processing pipeline 156 may be configured to perform various video operations on the view zone 310c and the view zone 310n in order to generate the output image, generate the similar image, preprocess images and/or perform the comparison for the video correctness check. The video processing pipeline 156 may operate on the pixel data in the view zones 310a-310n in parallel (e.g., without performing the same operations to enable video correctness checking twice sequentially for the input images and the similar images).

Figure 5:
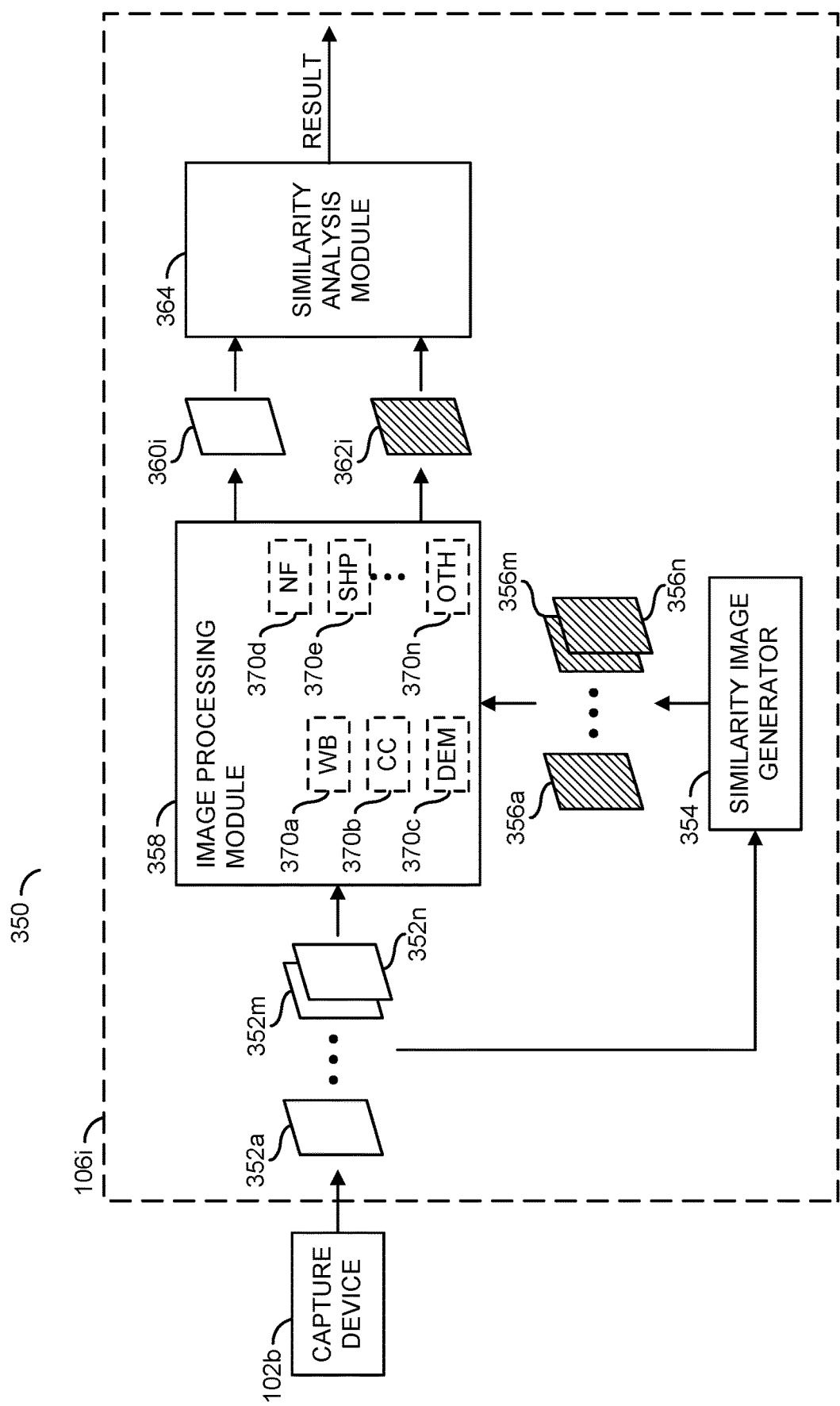
FIG. 5 is a block diagram illustrating performing a similarity analysis to determine video correctness.

Referring to FIG. 5, a block diagram illustrating performing a similarity analysis to determine video correctness is shown. A similarity analysis 350 is shown. The similarity analysis 350 may comprise the capture device 102b and/or the processor 106i. The similarity analysis 350 may comprise the capture device 102b presenting pixel data to the view zone 310c and the view zone 310n as shown in association with FIG. 4.

The processor 106i is shown comprising input video frames 352a-352n, a block (or circuit) 354, similar video frames 356a-356m, a block (or circuit) 358, a processed input image 360i, a processed similar image 362i and/or a block (or circuit) 364. The circuit 354 may implement a similar image generator. The circuit 358 may implement an image processing module. The circuit 364 may comprise a similarity analysis module. The processor 106i may comprise other components (not shown). The number, type and/or arrangement of the components of the processor 106*i* may be varied according to the design criteria of a particular implementation.

One or more of the similarity image generator 354, the image processing module 358 and/or the similarity analysis module 364 may be implemented within the video processing pipeline 156. One or more of the similarity image generator 354, the image processing module 358 and/or the similarity analysis module 364 may be implemented by a combination of the hardware engines 180*a*-180*n*. One or more of the similarity image generator 354, the image processing module 358 and/or the similarity analysis module 364 may be configured to operate in parallel on the pixel data in the view zones 310*a*-310*n*. One or more of the similarity image generator 354, the image processing module 358 and/or the similarity analysis module 364 may be configured to perform operations in response to computer readable instructions stored by the memory 108. In one example, the processor 106*i* may execute the computer readable instructions to process the pixel data arranged as video frames. In another example, the processor 106*i* may execute the computer readable instructions to generate the similar images 356*a*-356*n* from the input video frames 352*a*-352*n*. In yet another example, the processor 106*i* may execute the computer readable instructions to perform preprocessing on the input video frames 352*a*-352*n* and the similar images 356*a*-356*n*. In still another example, the processor 106*i* may be configured to perform a similarity check between the video frames 352*a*-352*n* and the similar images 356*a*-356*n* and determine an image correctness in response to the similarity check. The functionality and/or computer readable instructions executed by the similarity image generator 354, the image processing module 358 and/or the similarity analysis module 364 may be varied according to the design criteria of a particular implementation.

The capture devices 102*a*-102*n* may present the signals FRAMES_A-FRAMES_N to the processors 106*a*-106*n*. In the example shown, the capture device 102*b* may communicate the pixel data in the signal FRAMES_B to the processor 106*i*. The processors 106*a*-106*n* may be configured to process the pixel data arranged as video frames. The processor 106*i* may generate the input video frames 352*a*-352*n* in response to the pixel data received from the capture device 102*b*. The input video frames 352*a*-352*n* may be operated on in the view zones 310*a*-310*n* in parallel. The input video frames 352*a*-352*n* may be presented to the similarity image generator 354 and the image processing module 358. In an example, the video frames 352*a*-352*n* arranged from the pixel data in the view zone 310*c* may be presented to the image processing module 358 and the video frames 352*a*-352*n* arranged from the pixel data (e.g., from the same pixel data from the same region of interest 304) in the view zone 310*n* may be presented to the similarity image generator 354 to enable parallel paths of operations in the hardware modules 180*a*-180*n* of the same video processing pipeline 156.

The similarity image generator 354 may be configured to generate the similar images 356*a*-356*n* in response to the input images 352*a*-352*n*. In an example, the similarity image generator 354 may be configured to generate the similar images 356*a*-356*n* in the view zone 310*n* while the input images 352*a*-352*n* are operated on in the view zone 310*c*. The similarity engine 354 may be configured to implement a combination of non-linear filters and/or multiresolution linear noise reduction filters. In one example, the non-linear filters may or may not comprise artificial intelligence operations performed by the CNN 150 and/or other artificial neural networks. In some embodiments, the similarity engine 354 may perform a block-based decimation of the input video frames 352*a*-352*n* to generate the similar images 356*a*-356*n*. The similar images 356*a*-356*n* may be presented to the image processing module 358.

The image processing module 358 may be configured to perform various image signal processing operations. The image processing module 358 may operate on the pixel data in the view zones 310*a*-310*n* in parallel. By operating on the pixel data in the view zones 310*a*-310*n* in parallel, the image processing module 358 may perform the image signal processing operations on the input video frames 352*a*-352*n* and the similar images 356*a*-356*n* in parallel. Performing the image processing operations in parallel may enable the various operations without implementing more than one of the image processing module 358 for the similarity analysis 350. Performing the image processing operations in parallel may enable the various operations without performing the operations at a first time for the input video frames 352*a*-352*n* and then perform the operations again at a second time for the similar images 356*a*-356*n*.

The image processing module 358 may comprise blocks (or circuits) 370*a*-370*n*. The circuit 370*a* may comprise a white balance module. The circuit 370*b* may comprise a color correction module. The circuit 370*c* may comprise a demosaic module. The circuit 370*d* may comprise a noise filtering module. The circuit 370*e* may comprise a sharpening module. The circuits 370*a*-370*n* may implement other image signal processing modules (not shown). The circuits 370*a*-370*n* may be configured to perform image signal processing techniques on the pixel data in the view zones 310*a*-310*n* in parallel. The number and/or type of image signal processing modules that may operate in parallel on the input video frames 352*a*-352*n* and the similar images 356*a*-356*n* may be varied according to the design criteria of a particular implementation.

The white balance module 370*a* may be configured to perform automatic white balancing operations on the input video frames 352*a*-352*n* and the similar images 356*a*-356*n* in parallel. The color correction module 370*b* may be configured to perform color correction operations on the input video frames 352*a*-352*n* and the similar images 356*a*-356*n* in parallel. The demosaic module 370*c* may be configured to perform demosaic operations on the input video frames 352*a*-352*n* and the similar images 356*a*-356*n* in parallel. The noise filtering module 370*d* may be configured to perform noise filtering operations on the input video frames 352*a*-352*n* and the similar images 356*a*-356*n* in parallel. The sharpening module 370*e* may be configured to perform sharpening operations on the input video frames 352*a*-352*n* and the similar images 356*a*-356*n* in parallel. In some embodiments, the components 370*a*-370*n* may perform the individual operations (e.g., preprocessing) on the pixel data in the view zones 310*a*-310*n* in a particular sequence (e.g., white balance first, then sharpening, then noise filtering, etc.). The type and/or sequence of the operations performed by the components 370*a*-370*n* may be varied according to the design criteria of a particular implementation.

The image processing module 358 may be configured to perform the various image signal processing operations using the components 370*a*-370*n* to generate the processed input images 360*a*-360*n* and the processed similar images 362*a*-362*n*. The processed input images 360*a*-360*n* and the processed similar images 362*a*-362*n* may be presented to the similarity analysis module 364.

The processed input image 360i is shown as a representative example of the processed input images 360a-360n. The processed similar image 362i is shown as a representative example of the processed similar images 362a-362n. The similarity analysis module 364 may be configured to compare each of the processed input images 360a-360n with a corresponding one of the processed similar images 362a-362n. In an example, the processed input image 360i may be compared to the processed similar image 362i based on a timestamp associated with the input image 352i that was used to generate both the processed input image 360i and the processed similar image 362i. In another example, the processed input image 360i may be compared to the processed similar image 362i based on an order that the images are received.

The similarity analysis module 364 may be configured to perform a video correctness check in response to the comparison between the processed input images 360a-360n and the processed similar image 362a-362n. The video correctness for each of the input images 352a-352n (e.g., the input image 352i) may correspond to the comparison of one of the processed input images 360i and one of the similar images 362i. In one example, the similarity analysis module 364 may be configured to perform a block structural similarity index measure (SSIM) check. Details of the video correctness check performed by the similarity analysis module 364 may be described in association with FIG. 9.

The similarity analysis module 364 may generate a signal (e.g., RESULT). The signal RESULT may be generated in response to the comparison between the processed input images 360a-360n and the processed similar images 362a-362n. The signal RESULT may provide an indication of whether the video frame has passed or failed the video correctness check. The apparatus 100 may be configured to perform a response based on the result of the video correctness check. In one example, the processor 106i may generate the signal VCTRL in response to the signal RESULT. The signal VCTRL may initiate the reaction based on whether the video frame passed or failed the video correctness check. In one example, in response to the signal RESULT indicating an error check failure, the signal VCTRL may be generated that may reboot the apparatus 100. In another example, in response to the signal RESULT indicating an error check failure, the signal VCTRL may be generated that may activate and/or adjust a cooling system for the apparatus 100. In yet another example, in response to the signal RESULT indicating an error check failure, the signal VCTRL may be generated that may communicate a warning to an end-user. In still another example, in response to the signal RESULT indicating an error check pass, the apparatus 100 may continue to operate normally. The type of reaction performed in response to the signal RESULT may be varied according to the design criteria of a particular implementation.

The similarity check 350 may be performed to implement the video correctness checking using the view zones 310a-310n to perform the operations in parallel. Performing the operations in parallel may enable real-time results at a low cost since hardware may not need to be duplicated. Performing the operations in parallel may provide a fast and robust system performance since operations may not need to be repeated to generate the processed input images 360a-360n and the processed similar images 362a-362n. The similarity check 350 may comprise passing through the main image (e.g., the input images 352a-352n) through the image processing module 358 to generate the output image (e.g., the processed input images 360a-360n) and generating the similar images 356a-356n from the main images using the similarity image generator 354. The similarity check 350 may comprise performing a similarity related index check to judge whether or not the input video frames 352a-352n pass the video correctness check. If the video correctness check passes, the processed input video frames 360a-360n may be used for various operations (e.g., object detection, video output to the displays 118a-118n, 3D reconstruction, stereo vision disparity analysis, etc.). The view zones 310a-310n implemented by the video processing pipeline 156 may enable the similarity image generator 354 to be implemented efficiently.

Figure 6:
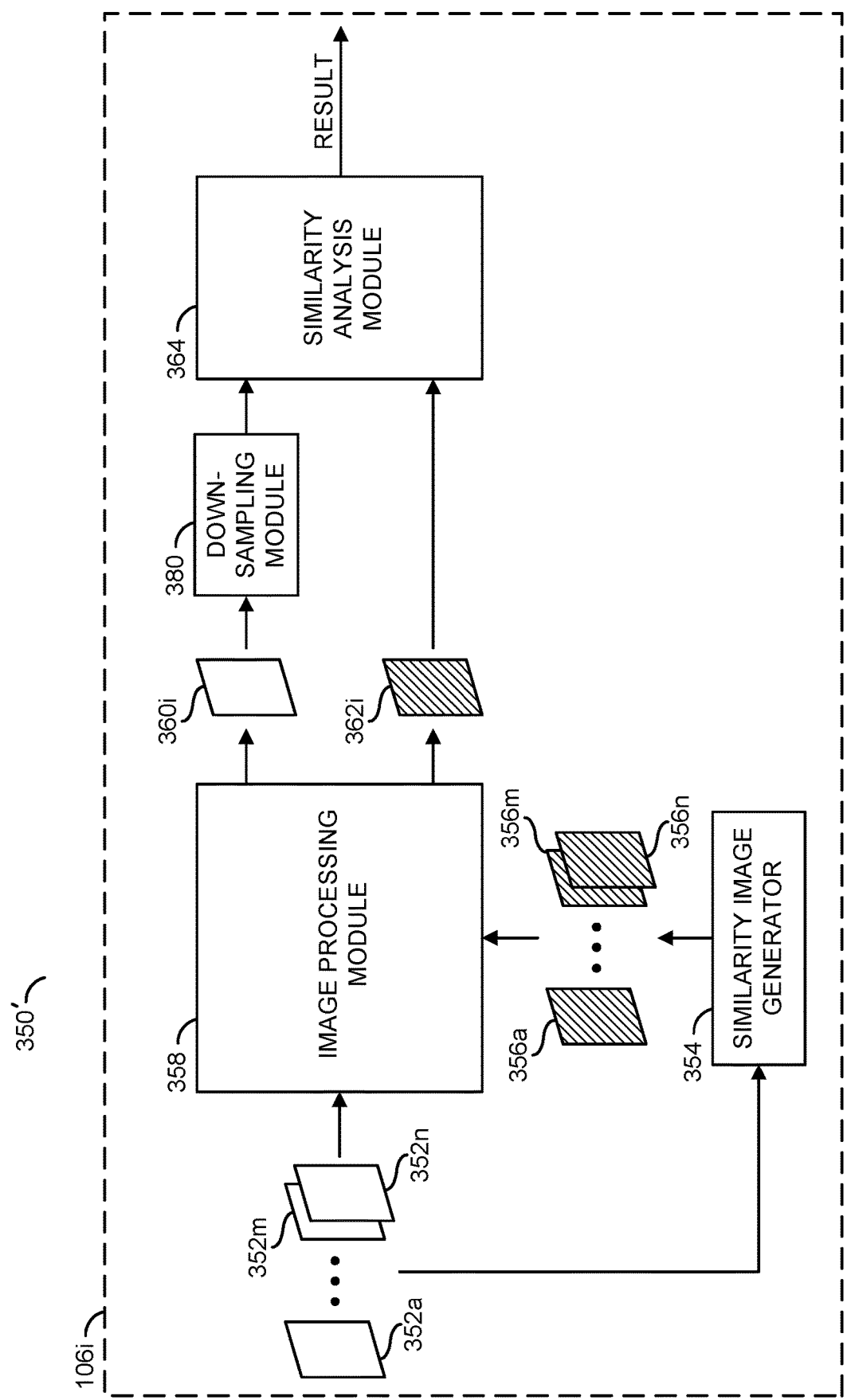
FIG. 6 is a block diagram illustrating a video correctness check with downsampling.

Referring to FIG. 6, a block diagram illustrating a video correctness check with downsampling is shown. The similarity analysis 350' is shown. The similarity analysis 350' may be an alternate embodiment of the similarity analysis 350 described in association with FIG. 5. The similarity analysis 350' may comprise the processor 106i.

The processor 106i is shown comprising the input video frames 352a-352n, the similarity image generator 354, the similar images 356a-356n, the image processing module 358, the processed input image 360i, the processed similar image 362i and the similarity analysis module 364. In the similarity analysis 350', the processor 106i may further comprise a block (or circuit) 380. The circuit 380 may implement a downsampling module. The downsampling module 380 may be configured to operate on the pixel data in the view zones 310a-310n.

The downsampling module 380 may be configured to receive the processed input images 360a-360n. The downsampling module 380 may be configured to perform a block based decimation on the processed input images 360a-360n to generate downsampled input images. In one example, the downsampling module 380 may perform a 1/12.5 height and width down-sampling of the processed input images 360a-360n. The downsampling module 380 may present the downsampled input images to the similarity analysis module 364.

The similarity image generator 354 may be configured to generate the similar images 356a-356n using various image processing techniques (e.g., upsampling, downsampling, non-linear filters, multiresolution linear filters, noise reduction filters, etc.). In the similarity analysis 350', the similarity image generator 354 may be configured to generate the similar images 356a-356n based on a downsampling operation. The similar images 356a-356n generated by downsampling the input images 352a-352n may be processed by the image processing module 358 to generate the processed similar images 362a-362n. The downsampling performed by the similarity image generator 354 may operate on the view zones 310a-310n in order to perform the downsampling in parallel with the operations performed on the input images 352a-352n. The processors 106a-106n implementing the view zones 310a-310n may enable the apparatus 100 to efficiently generate the similar images 356a-356n by downsampling.

In the similarity analysis 350', the similarity analysis module 364 may be configured to perform a comparison and/or evaluation of the processed input images 360a-360n that have been downsampled by the downsampling module 380 and the processed similar images 362a-362n. The processed input image 360i may be downsampled by the downsampling module 380 after the image processing operations have been performed on the input images 352a-352n by the image processing module 358. The similar images 356a-356n may be downsampled versions of the input images 352a-352n that are then processed by the image processing module 358. For example, the processed input images 360a-360n may be downsampled after the image processing, and the processed similar images 362a-362n may be a result of downsampling performed before the image processing.

The downsampling module 380 may be configured to downsample the processed input images 360a-360n in order to match a size of the processed similar images 362a-362n. For example, the downsampling operation performed by the downsampling module 380 may reduce the size of the processed input images 360a-360n to match (e.g., a resolution, an aspect ratio, a number of pixels, a target depth resolution (e.g., similar total number of pixels, even with different dimensions), etc.) the size of the processed similar images 362a-362n.

Downscaling the size of the processed input images 360a-360n to match the size of the processed similar images 362a-362n may enable the video correctness check performed by the similarity analysis module 364 to be performed efficiently. For example, a block-based analysis may be performed on the processed input images 360a-360n and the similarity images 362a-362n for the video correctness check. When the size of the processed input images 360a-360n and the size of the similarity images 362a-362n match, the corresponding locations of each of the images may be compared without performing other additional data manipulation (e.g., a one-to-one block-based analysis may be performed).

Figure 7:
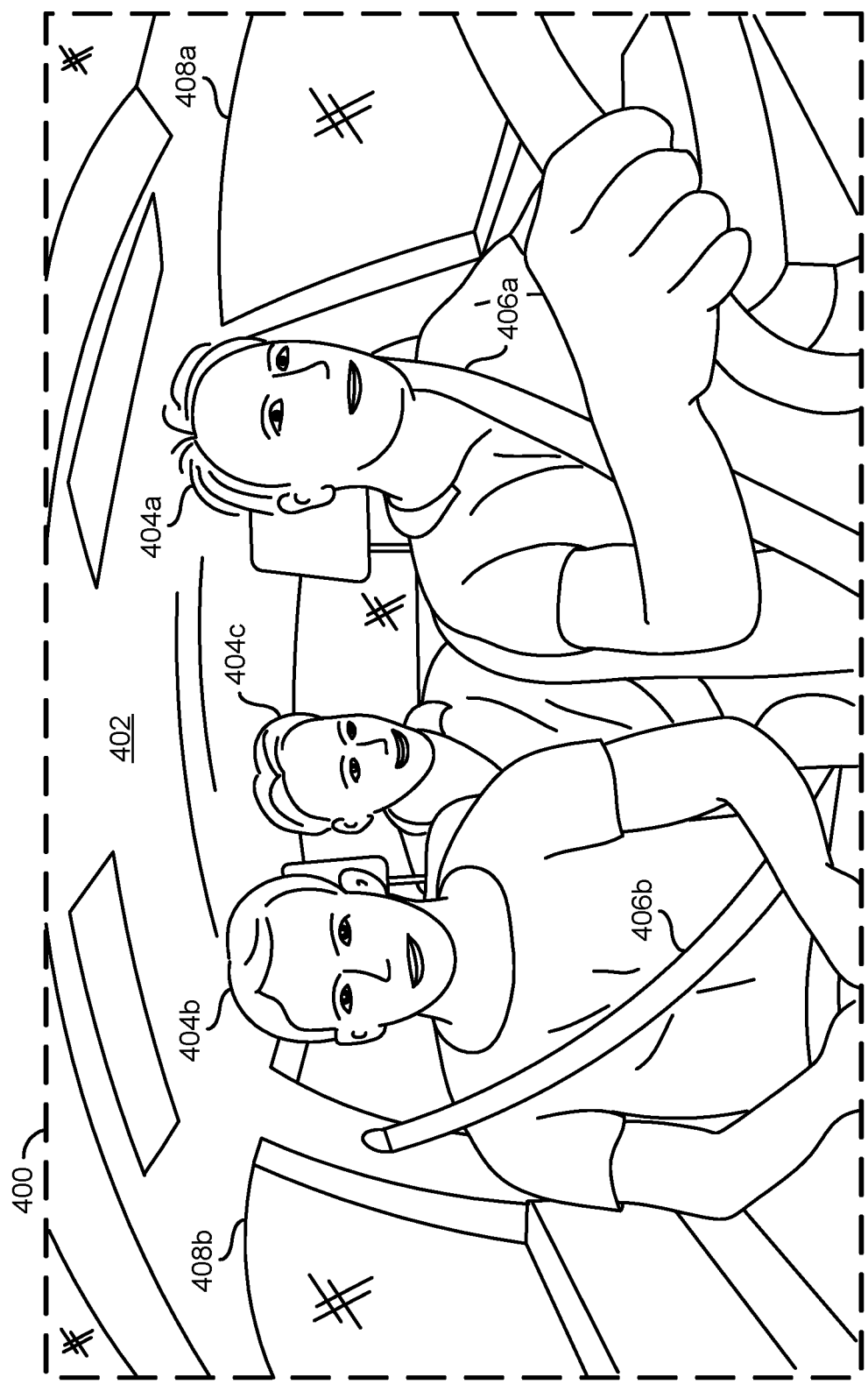
FIG. 7 is a diagram illustrating an example preprocessed full resolution video frame.

Referring to FIG. 7, a diagram illustrating an example preprocessed full resolution video frame is shown. An example video frame 400 is shown. The example video frame 400 may be a representative example of one of the input video frames 352a-352n or one of the processed input video frames 360a-360n.

The example video frame 400 may comprise a full resolution video frame. In an example, the video frame 400 may be a 3840×2160 video frame, a 2000×1200 video frame, a 1920×1080, etc. In one example, the video frame 400 may be presented to the image processing module 358 to provide automatic white balance, demosaic, color correction, noise filtering, and sharpening, etc. In another example, the video frame 400 may be presented to the similarity analysis module 364 for comparison with a corresponding one of the processed similar images 362a-362n.

In the example shown, the video frame 400 may provide a view of an interior 402 of the vehicle 50. For example, the capture device 102i that captured the video frame 400 may be directed within the vehicle 50 to provide the field of view 204a-204b. The pixel data of the interior 402 may comprise vehicle occupants (e.g., people) 404a-404c, seatbelts 406a-406b, windows 408a-408b, etc. The full resolution video frame 400 may provide a high level of detail that may be analyzed by the processors 106a-106n and/or the CNN module 150 for object detection. The object detection may rely on the video frame 400 providing accurate pixel data (e.g., without errors). The video correctness check performed by the apparatus 100 may be configured to detect errors and/or determine whether the video frame 400 passes a threshold check for video accuracy. If the video frame 400 is presented to the similarity analysis module 364 without downscaling, then the similarity analysis module 364 may perform additional data manipulation operations in order to perform the block-based analysis for the similarity check with the corresponding one of the processed similar images 362a-362n.

Figure 8:
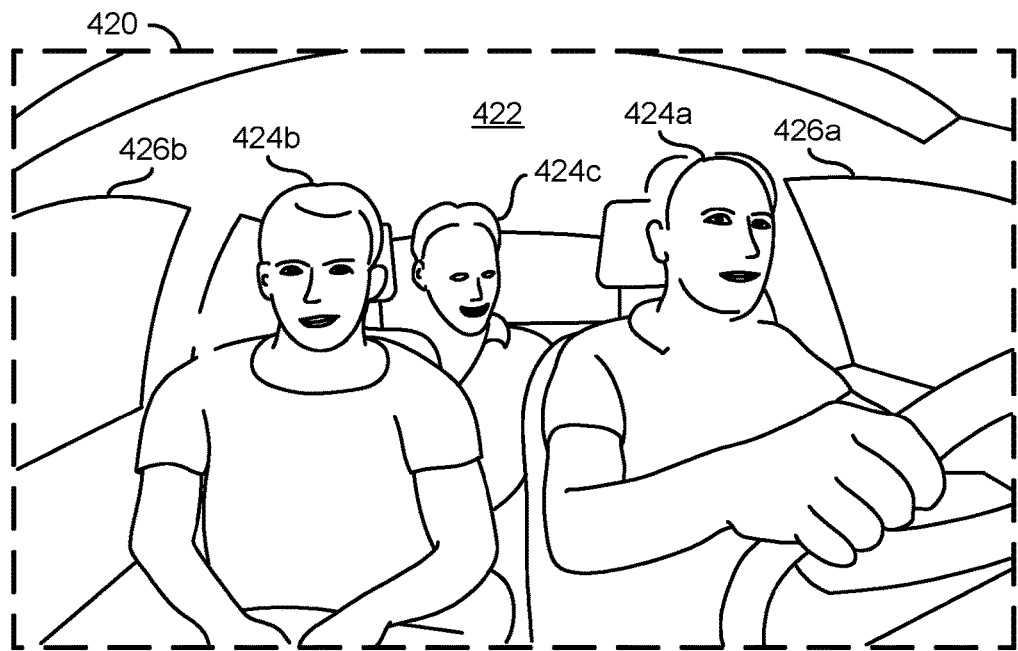
FIG. 8 is a diagram illustrating an example downscaled image generated from a full resolution video frame.

Referring to FIG. 8, a diagram illustrating an example downscaled image generated from a full resolution video frame is shown. The example downscaled image 420 may be a representative example of one of the similar images 356a-356n or one of the processed similar video frames 362a-362n. In some embodiments, the downscaled image 420 may be an example of the downscaled version of the processed input video frames 360a-360n generated by the downsampling module 380. For example, the downscaled image 420 may be a representative example of downscaled images 420a-420n generated by the downsampling module 380 and presented to the similarity analysis module 364.

The example video frame 420 may comprise a downscaled resolution video frame generated from a high resolution video frame. The downscaled video frame 420 may comprise pixel data similar to the pixel data of the full resolution video frame 400 shown in association with FIG. 8. In an example, if the input video frame (e.g., the full resolution video frame 400 shown in association with FIG. 7) is a 2000×1200 video frame, then the similarity image 420 may a 160×96 video frame (e.g., a 12.5 times downsampling).

In one example, the downscaled video frame 420 may be generated from the input video frames 352a-352n by the similarity image generator 354 and then presented to the image processing module 358 to provide automatic white balance, demosaic, color correction, noise filtering, and sharpening, etc. In another example, the downscaled video frame 420 may be generated by the image processing module 358 from the similar images 356a-356n and then presented to the similarity analysis module 364 for comparison with the corresponding one of the processed similar images 362a-362n. In yet another example, the downscaled video frame 420 may be generated from the processed input video frames 360a-360n by the downsampling module 380 and then presented to the similarity analysis module 364.

The example downscaled video frame 420 may comprise pixel data arranged as a video frame that is similar to the pixel data in the example full resolution video frame 400 shown in association with FIG. 7. Since the downscaled video frame 420 comprises less pixel data than the full resolution video frame 400, the pixel data in the downscaled video frame 420 may comprise less detail than the pixel data in the full resolution video frame 400. For example, the downscaled video frame 420 may not be suitable for performing object detection.

In the example shown, the downscaled video frame 420 may provide a low detail view of an interior 422 of the vehicle 50. The pixel data of the low detail view of the interior 422 may comprise low detail vehicle occupants (e.g., people) 424a-424c, and low detail windows 426a-426b. Since the downscaled video frame 420 does not provide a high level of detail, the downscaled video frame 420 may be missing visual information. For example, various details about the low detail vehicle occupants 424a-424c may not be visible (e.g., fewer details about the face, characteristics of the clothing worn may not be visible, facial features may not be detectable, etc.). In another example, the seatbelts 406a-406b visible in the full resolution video frame 400 may not be visible in the downscaled video frame 420. Generally, the downscaled video frame 420 may not provide a sufficient amount of pixel data for the CNN module 150 to perform object detection. The video correctness check performed by the apparatus 100 may be configured to detect errors and/or determine whether the video frame 400 passes a threshold check for video accuracy based on a comparison using the downscaled video frame 420.

Figure 9:
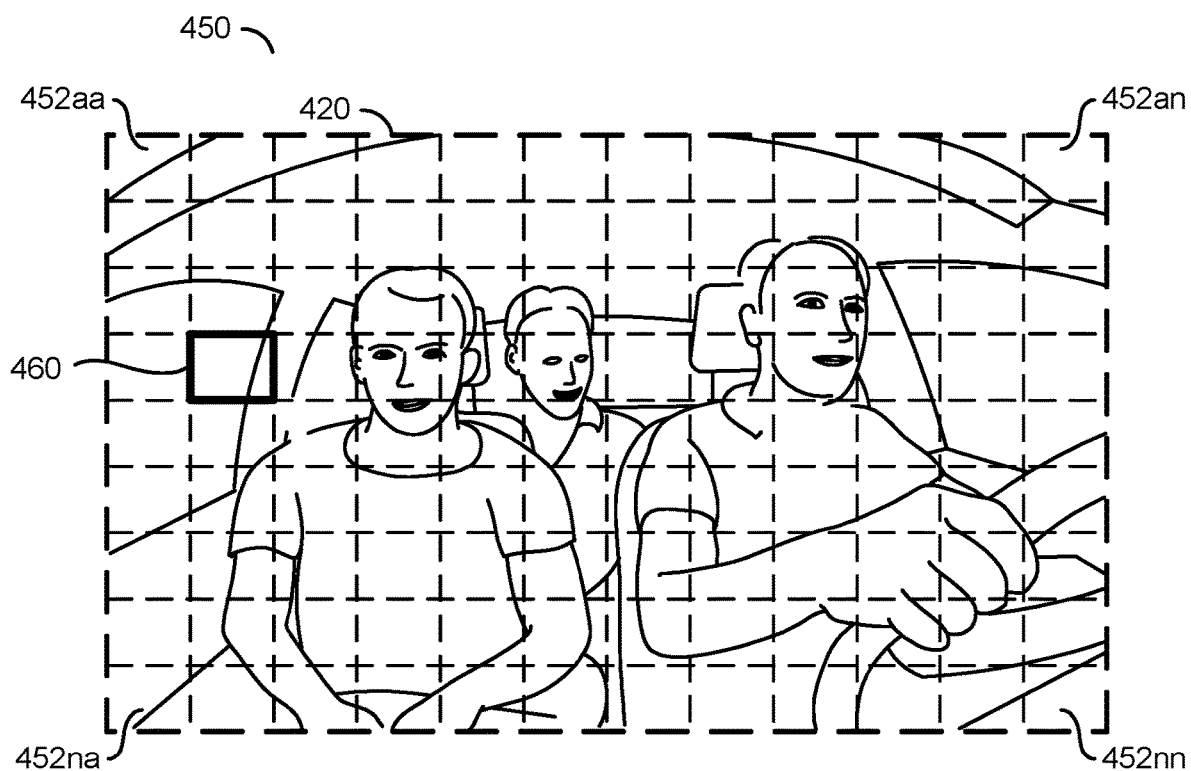
FIG. 9 is a diagram illustrating an error block.

Referring to FIG. 9, a diagram illustrating an error block is shown. An example illustration of an error check 450 is shown. The error check 450 may comprise the downscaled video frame 420. In an example, the video frame 420 may comprise the same visual data (e.g., pixel data) as the downscaled video frame 420 shown in association with FIG. 8.

A grid is shown over the downscaled video frame 420. The grid may comprise blocks 452aa-452nn. In one example, each of the blocks 452aa-452nn may comprise an 8×8 block of pixels. In the example shown, for illustrative purposes the downscaled video frame may have a grid of 9 rows and 12 columns of the 8×8 blocks 452aa-452nn (e.g., a 96×72 resolution image). In the example downscaled image 420 with the resolution of 160×96, there may be 12 rows of the blocks 452aa-452nn, with each of the 12 rows comprising 20 of the blocks 452aa-452nn. The number of pixels in each of the blocks 452aa-452nn and/or the arrangement of the blocks 452aa-452nn on the downscaled video frame 420 may be varied according to the design criteria of a particular implementation.

An error block 460 is shown. In the example shown, the error block 460 may be at an index (4,2) of the blocks 452aa-452nn. The error block 460 may indicate that there is a defect in the processed video frames 360a-360n analyzed by the similarity analysis module 364. In an example, the error block 460 may be a blocky section, a color error, a broken line, a bad spot, etc. The type of visual defect detected as the error block 460 using the video correctness check may be varied according to the design criteria of a particular implementation.

The similarity analysis module 364 may perform a structural similarity index measure (SSIM) operation on the processed input images 360a-360n and the processed similar images 362a-362n. The SSIM operation may perform a SSIM calculation for each of the 8×8 blocks 452aa-452nn. In the example, shown with a 96×72 resolution image, there may be 9×12 SSIM values. In another example, with a 160×96 resolution image, there may be 12×20 SSIM values. The number of SSIM values calculated by the similarity analysis module 364 may be varied based on the resolution of the processed input images 360a-360n and/or the processed similar images 362a-362n.

The similarity analysis module 364 may be configured to determine the video correctness result by comparing the SSIM values for each of the blocks 452aa-452nn to a threshold value. In one example, the threshold value may be 0.9. With the threshold value of 0.9, in order for the processed images 360a-360n to pass the error block checking, the SSIM value for each of the blocks 452aa-452nn may need to be larger than 0.9. Each of the blocks 452aa-452nn that are less than or equal to 0.9, may be identified as one of the error blocks 460.

Threshold values lower or higher than 0.9 may be used. In an example, the threshold value for SSIM may be a user-defined setting. Setting the threshold value to a lower value may allow for lower correctness to be acceptable (e.g., some small differences may not fail the correctness check). Setting the threshold value to a higher value may limit a correctness check pass only to high correctness (e.g., very few, or no differences). In an example, for an automotive implementation (e.g., lane detection, object detection, autonomous driving, etc.) the threshold value of 0.9 may be selected. The threshold value may be varied according to the design criteria of a particular implementation.

The SSIM values may be calculated by the similarity analysis module 364 in response to luminance measurements and comparisons, contrast measurements and comparisons, structural comparisons, etc. in order to determine a similarity measurement. The SSIM values may provide an indication of a perceived change in structural information between the processed input video frames 360a-360n and the processed similar images 362a-362n. The SSIM values may provide an indication of the inter-dependencies between pixels that are spatially close (e.g., within the blocks 452aa-452nn).

Example values for the SSIM operation performed by the similarity analysis module 364 on the example video frame 420 are shown in TABLE 1:

TABLE 1

| Index | 1 | 2 | 3 | 4 | 5 | 6 | 7 | 8 | 9 | 10 | 11 | 12 |
|---|---|---|---|---|---|---|---|---|---|---|---|---|
| 1 | 1 | 1 | 1 | 1 | 1 | 1 | 1 | 1 | 1 | 1 | 1 | 1 |
| 2 | 1 | 1 | 1 | 1 | 1 | 1 | 1 | 1 | 1 | 1 | 1 | 1 |
| 3 | 1.0000 | 0.9966 | 1.0000 | 1 | 1 | 1 | 1 | 1 | 1 | 1 | 1 | 1 |
| 4 | 0.9973 | 0.3485 | 0.9990 | 1 | 1 | 1 | 1 | 1 | 1 | 1 | 1 | 1 |
| 5 | 1.0000 | 0.9911 | 1.0000 | 1 | 1 | 1 | 1 | 1 | 1 | 1 | 1 | 1 |
| 6 | 1 | 1 | 1 | 1 | 1 | 1 | 1 | 1 | 1 | 1 | 1 | 1 |
| 7 | 1 | 1 | 1 | 1 | 1 | 1 | 1 | 1 | 1 | 1 | 1 | 1 |
| 8 | 1 | 1 | 1 | 1 | 1 | 1 | 1 | 1 | 1 | 1 | 1 | 1 |
| 9 | 1 | 1 | 1 | 1 | 1 | 1 | 1 | 1 | 1 | 1 | 1 | 1 |

Generally, the SSIM values for the example video frame 420 may have a value of 1 (e.g., passes the error check). The error block 460 is shown on the example video frame 420 at the location (4,2). The SSIM values around the index location (4,2) in TABLE 1 may be 1.0000 at (3,1), 0.9966 at (3,2), 1.0000 at (3,3), 0.9973 at (4,1), 0.9990 at (4,3), 1.0000 at (5,1), 0.9911 at (5,2) and 1.0000 at (5,3). Each of the values around the index location (4,2) may be greater than the threshold value of 0.9 and pass the correctness check. However, the SSIM value at (4,2) may be 0.3485. Since the SSIM value at the location (4,2) may be less than the threshold value of 0.9, the similarity analysis module 364 may identify block (4,2) as the error block 460.

The similarity analysis module 364 may generate the signal RESULT in response to the comparison of the SSIM values to the threshold value. The signal RESULT may indicate whether the processed input images 360a-360n passed or failed the video correctness check. In an example, the one of the processed input images 360a-360n that corresponds to the example video frame 420 may fail the video correctness check in response to the detection of the error block 460.

The processors 106a-106n may perform an action in response to whether the signal RESULT indicates that the processed input video frames 360a-360n passed or failed the video correctness check. For each of the processed input video frames 360a-360n that passes the video correctness check, the processors 106a-106n may use the processed input video frames 360a-360n for various functionality (e.g., encode the video frames 360a-360n for output to one or more of the displays 118a-118n, packetize the video frames 360a-360n for communication to another device via the communication devices 110, provide as input to the CNN module 150 for object detection, etc.). In one example, when one of the processed input video frames 360a-360n fails the video correctness check, the video frame that failed may be discarded. In another example, when one of the processed input video frames 360a-360n fails the video correctness check, the signal RESULT may be used to generate the signal VCTRL, which may initiate a device reboot (e.g., rebooting and reinitializing the apparatus 100 may prevent additional errors). The reaction performed in response to the signal RESULT indicating that the video correctness check may depend on the use case of the apparatus 100. The reaction performed in response to the signal RESULT indicating that the video correctness check may be customizable. The reactions performed by the apparatus 100 in response to either a pass or a failure of the video correctness check may be varied according to the design criteria of a particular implementation.

Figure 10:
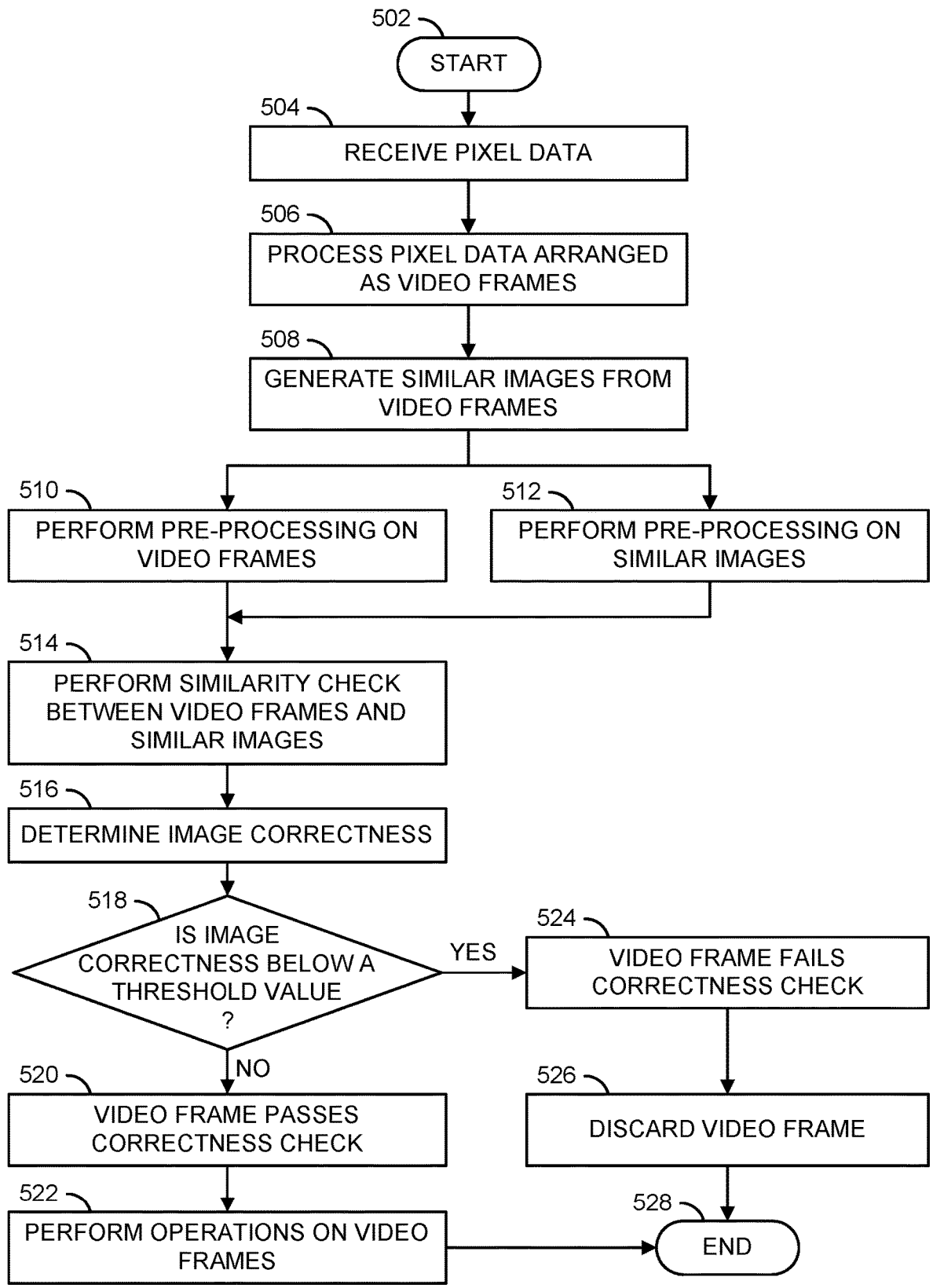
FIG. 10 is a flow diagram illustrating a method for performing video correctness checking.

Referring to FIG. 10, a method (or process) 500 is shown. The method 500 may perform video correctness checking. The method 500 generally comprises a step (or state) 502, a step (or state) 504, a step (or state) 506, a step (or state) 508, a step (or state) 510, a step (or state) 512, a step (or state) 514, a step (or state) 516, a decision step (or state) 518, a step (or state) 520, a step (or state) 522, a step (or state) 524, a step (or state) 526, and a step (or state) 528.

The step 502 may start the method 500. In the step 504, one or more of the capture devices 102a-102n may receive pixel data. In an example, the image sensor 140a may convert the light input IM_A into pixel data. Next, in the step 506, the processors 106a-106n may process the pixel data arranged as video frames. In an example, the processors 106a-106n may receive the signals FRAMES_A-FRAMES_N comprising the pixel data arranged as the video frames 352a-352n and/or convert the pixel data into video frames 352a-352n. In the step 508, the similarity image generator 354 may generate the similar images 356a-356n in response to the input video frames 352a-352n. Next, the method 500 may move to the step 510 and the step 512.

The steps 510-512 may be performed in parallel. In the step 510, the image processing module 358 may perform the preprocessing on the input video frames 352a-352n to generate the processed input video frames 360a-360n. The preprocessing may comprise automatic white balance, demosaic, color correction, noise filtering, and sharpening, etc., Next, the method 500 may move to the step 514. In the step 512, the image processing module 358 may perform the preprocessing on the similar images 356a-356n to generate the processed similar images 362a-362n. Next, the method 500 may move to the step 514.

In the step 514, the similarity analysis module 364 may perform the similarity check between the processed input video frames 360a-360n and the processed similar images 362a-362n. In an example, the similarity check may comprise a SSIM check. Next, in the step 516, the similarity analysis module 364 may determine the image correctness. For example, the similarity analysis module may generate the SSIM results and generate the signal RESULT that provides an indication of the image correctness. Next, the method 550 may move to the decision step 518.

In the decision step 518, the processors 106a-106n may determine whether the image correctness is below a threshold value. In an example, the similarity analysis module 364 may generate SSIM values for each of the blocks 452aa-452nn of comparison between the processed input video frames 360a-360n and the processed similarity images 362a-362n. When the SSIM result is below a threshold value, the block may be considered the error block 460. If the image correctness is above the threshold value, then the method 500 may move to the step 520. In the step 520, the processors 106a-106n may determine that the one of the video frames 352a-352n that corresponds to the respective one of the processed input images 360a-360n and the respective one of the processed similarity images 362a-362n may pass the correctness check. Next, in the step 522, the processors 106a-106n may perform various operations on the video frames. For example, the video frames 352a-352n that pass the correctness check may be encoded, be used for computer vision operations, may be packetized for output to one or more of the displays 118a-118n, may be packetized for communication to an external device, etc. Next, the method 500 may move to the step 528.

In the decision step 518, if the image correctness is below the threshold value, then the method 500 may move to the step 524. In the step 524, the processors 106a-106n may determine that the one of the video frames 352a-352n that corresponds to the respective one of the processed input images 360a-360n and the respective one of the processed similarity images 362a-362n may fail the correctness check. Next, in the step 526, the processors 106a-106n may discard the video frame. In some embodiments, the processors 106a-106n may perform other operations (e.g., generate the signal VCTRL to perform a particular response such as notify an end-user, increase cooling, reboot the system, etc.). Next, the method 500 may move to the step 528. The step 528 may end the method 500.

Figure 11:
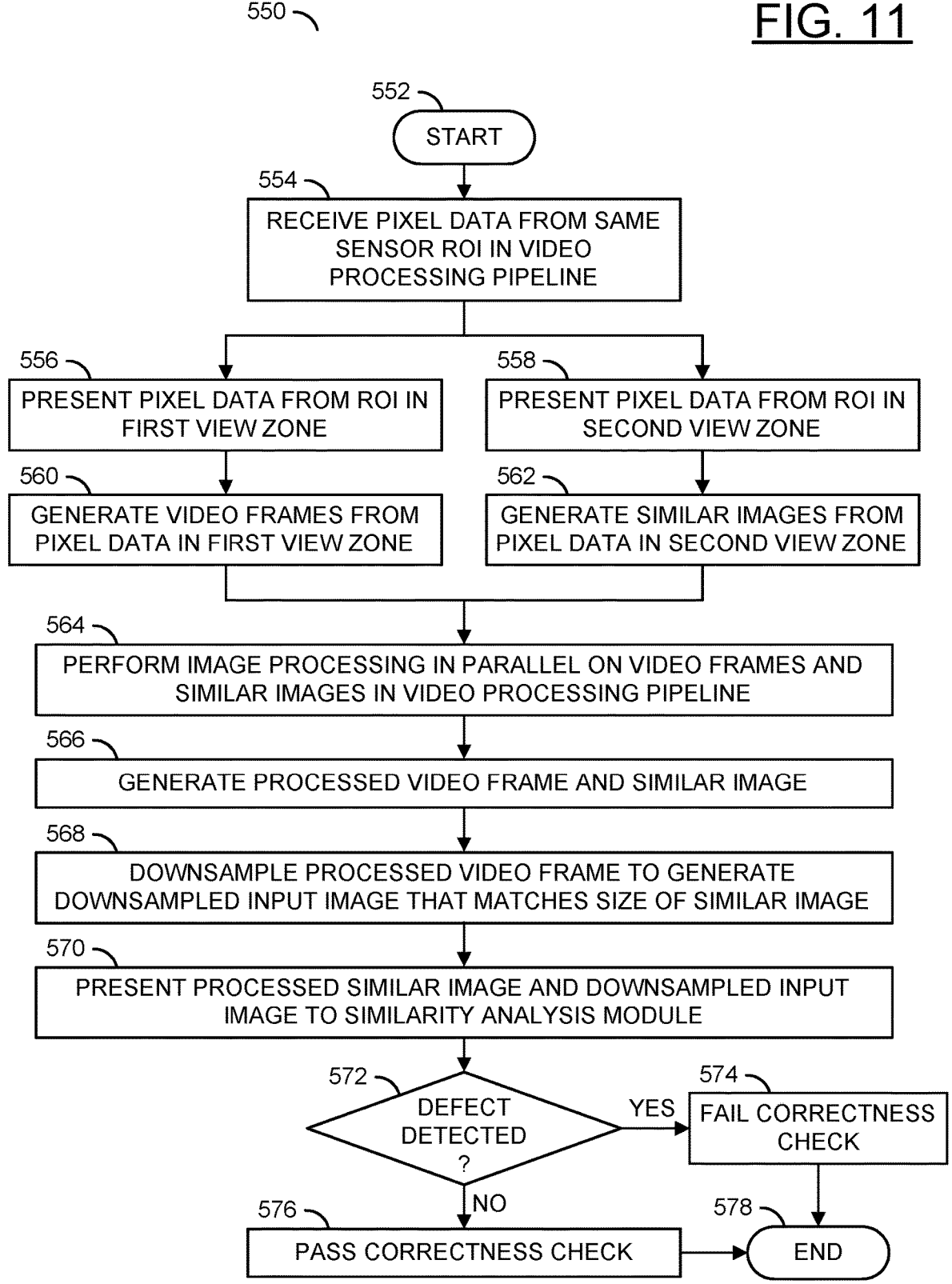
FIG. 11 is a flow diagram illustrating a method for using view zones to perform image processing on input video frames and similar images in parallel.

Referring to FIG. 11, a method (or process) 550 is shown. The method 550 may use view zones to perform image processing on input video frames and similar images in parallel. The method 550 generally comprises a step (or state) 552, a step (or state) 554, a step (or state) 556, a step (or state) 558, a step (or state) 560, a step (or state) 562, a step (or state) 564, a step (or state) 566, a step (or state) 568, a step (or state) 570, a decision step (or state) 572, a step (or state) 574, a step (or state) 576, and a step (or state) 578.

The step 552 may start the method 550. In the step 554, the video processing pipeline 156 may receive the pixel data from the same region of interest 304 of one of the images sensors 140a-140n. Next, the method 550 may move to the step 556 and the step 558. In the step 556, the video processing pipeline 156 may present the pixel data from the region of interest 304 in the view zone 310c. Next, in the step 560, the video processing pipeline 156 may generate the video frames 352a-352n from the pixel data in the view zone 310c. Next, the method 550 may move to the step 564. In the step 558, the video processing pipeline 156 may present the same pixel data from the region of interest 304 in the view zone 310n. Next, in the step 562, the similarity image generator 354 may generate the similar images 356a-356n from the pixel data in the view zone 310n. Next, the method 550 may move to the step 564. In an example, the view zone 310c and the view zone 310n may comprise the same pixel data from the region of interest 304. The view zones 310a-310n implemented in the video processing pipeline 156 may enable the hardware modules 180a-180n to operate on the pixel data in parallel (e.g., without providing multiple implementations of the same hardware paths and/or without repeating operations on the pixel data twice). For example, the steps 556-562 may be performed in parallel and/or substantially in parallel.

In the step 564, the image processing module 358 may perform image processing in parallel on the input video frames 352a-352n and the similar images 356a-356n in the video processing pipeline 156. For example, the image processing module 358 may be configured to operate on the pixel data and/or video data in the view zone 310c and the view zone 310n in parallel. Next, in the step 566, the image processing module 358 may generate the processed input video frames 360a-360n and the processed similar images 362a-362n. In the step 568, the downsampling module 380 may downsample the processed input video frames 360a-360n to generate the downsampled input images 420a-420n. The processed input video frames 360a-360n may be downscaled by the downsampling module 380 to match a resolution of the processed similar images 362a-362n. For example, the similar images 356a-356n may be downsampled versions of the video frames 352a-352n that may then be preprocessed by the image processing module 358, while the downsampled video frames 420a-420n may be the input video frames 352a-352n that have been preprocessed by the image processing module 358 and then downsampled after the preprocessing. Next, in the step 570, the image processing module 358 may present one of the processed similar images 362a-362n to the similarity analysis module 364 and the downsampling module 380 may present the corresponding one of the downscaled images 420a-420n to the similarity analysis module 364. Next, the method 550 may move to the decision step 572.

In the decision step 572, the similarity analysis module 364 may determine whether a defect has been detected (e.g., perform the similarity check). If the defect has been detected, then the method 550 may move to the step 574. In the step 574, the processors 106a-106n may determine that the corresponding one of the video frames 352a-352n has failed the correctness check. Next, the method 550 may move to the step 578. In the decision step 572, if the defect has not been detected, then the method 550 may move to the step 576. In the step 576, the processors 106a-106n may determine that the corresponding one of the video frames 352a-352n has passed the correctness check. Next, the method 550 may move to the step 578. The step 578 may end the method 550.

Figure 12:
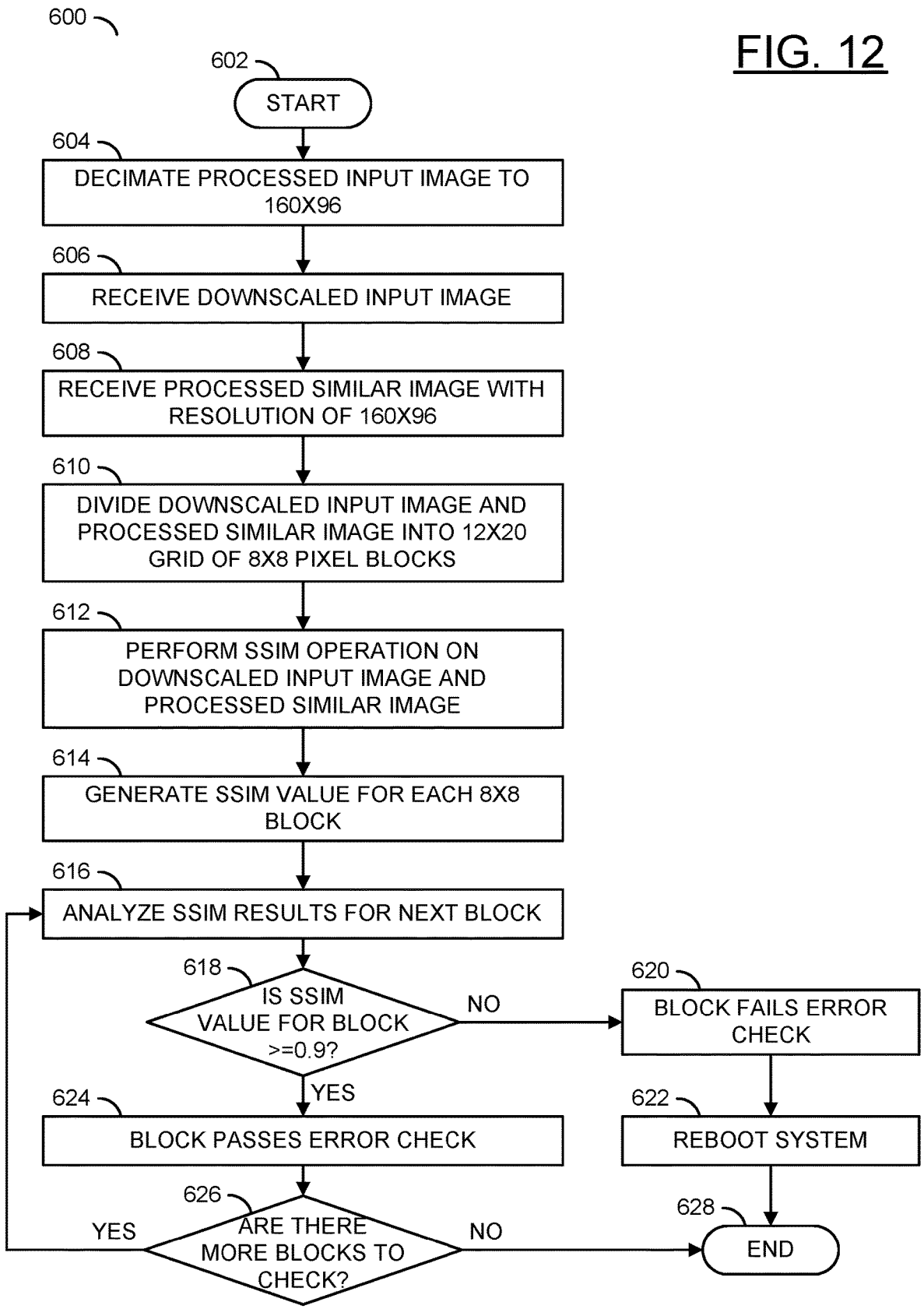
FIG. 12 is a flow diagram illustrating a method for performing a block structural similarity index measure check on pixel blocks of an input video frame and a similar image.

Referring to FIG. 12, a method (or process) 600 is shown. The method 600 may perform a block structural similarity index measure check on pixel blocks of an input video frame and a similar image. The method 600 generally comprises a step (or state) 602, a step (or state) 604, a step (or state) 606, a step (or state) 608, a step (or state) 610, a step (or state) 612, a step (or state) 614, a step (or state) 616, a decision step (or state) 618, a step (or state) 620, a step (or state) 622, a step (or state) 624, a decision step (or state) 626, and a step (or state) 628.

The step 602 may start the method 600. In the step 604, the downsampling module 380 may decimate one of the processed input images 360a-360n to a resolution of 160×96. In an example, the resolution 160×96 may match a resolution of the similar images 356a-356n generated by the similarity image generator 354. Next, in the step 606, the similarity analysis module 364 may receive the downscaled input image 420i. In the step 608, the similarity analysis module 364 may receive the processed similar image 362i with the resolution 160×96. While a resolution of 160×96 is used as a representative example, other matching resolutions may be implemented. Next, the method 600 may move to the step 610.

In the step 610, similarity analysis module 364 may divide the downscaled input image 420i and the processed similar image 362i into a 12×20 grid of pixel blocks 452aa-452nn. Each of the pixel blocks 452aa-452nn may be an 8×8 block of pixels. The size of the grid and/or the size of the pixel blocks 452aa-452nn may be varied based on the size of the downscaled input images 420a-420n and/or the processed similar images 362a-362n. Next, in the step 612, the similarity analysis module 364 may perform the SSIM operation on the pixel blocks 452aa-452nn of the downscaled input image 420i and the processed similar image 362i. In the step 614, the similarity analysis module 364 may generate a SSIM value for each of the 8×8 pixel blocks 452aa-452nn. Next, in the step 616, the similarity analysis module 364 may analyze the SSIM result for a next one of the blocks 452aa-452nn. Next, the method 600 may move to the decision step 618.

In the decision step 618, the similarity analysis module 364 may determine whether the SSIM value for the one of the pixel blocks 452aa-452nn has a value greater than or equal to 0.9. The value of 0.9 may be the threshold value. The threshold value may be set to a value above or below 0.9 depending on how much difference between the images is determined to be acceptable. For example, different usage scenarios may have a lower threshold for similarity. In an example of an automotive usage scenario (e.g., computer vision for autonomous driving), the threshold value may be set to a high value. A smaller SSIM value may allow lower correctness (e.g., small difference may be considered acceptable). If the SSIM value is less than 0.9, then the method 600 may move to the step 620. In the step 620, the analyzed block may be an error block 460 that fails the error check. For example, the similarity analysis module 364 may generate the signal RESULT indicating a failure. Next, the method 600 may move to the step 622. In the step 622, the processors 106a-106n may generate the signal VCTRL to reboot the system 100. In an example, rebooting the system 100 may prevent additional errors and/or enable rebooting the system 100 to an error-free state. Next, the method 600 may move to the step 628.

In the decision step 618, if the SSIM value is greater than or equal to 0.9, then the method 600 may move to the step 624. In the step 624, the analyzed block may pass the error check. For example, the similarity analysis module 364 may generate the signal RESULT indicating no error. Next, the method 600 may move to the decision step 626.

In the decision step 626, the similarity analysis module 364 may determine whether there are more of the pixel blocks 452aa-452nn to check. If there are more of the pixel blocks 452aa-452nn to check, then the method 600 may return to the step 616. While the steps 616-626 are shown checking the pixel blocks 452aa-452nn sequentially for illustrative purposes, one or more of the steps 616-626 may be performed in parallel. For example, the view zones 310a-310n of the video processing pipeline 156 may enable the similarity analysis module 364 to perform the SSIM analysis on each of the pixel blocks 452aa-452nn of the downscaled images 420a-420n and/or the processed similar images 362a-362n in parallel. In the decision step 626, if there are no more of the pixel blocks 452aa-452nn to check, then the method 600 may move to the step 628. The step 628 may end the method 600.

In the method 600 shown, one error block may result in the video frames 352a-352n failing the error check. For example, the system 100 may be rebooted in response to any one error block 460 being detected. The number of error blocks 460 detected before a reaction is performed by the processors 106a-106n may be an end-user defined setting. In some embodiments, more than one error block may be acceptable. In an example of the apparatus 100 being implemented in the vehicle 50 for using the video frames 352a-352n for computer vision operations to implement autonomous driving, one error block 460 may be unacceptable. The number of error blocks 460 determined to be acceptable before a reaction is performed by the processors 106a-106n may be varied according to the design criteria of a particular implementation.

Figure 13:
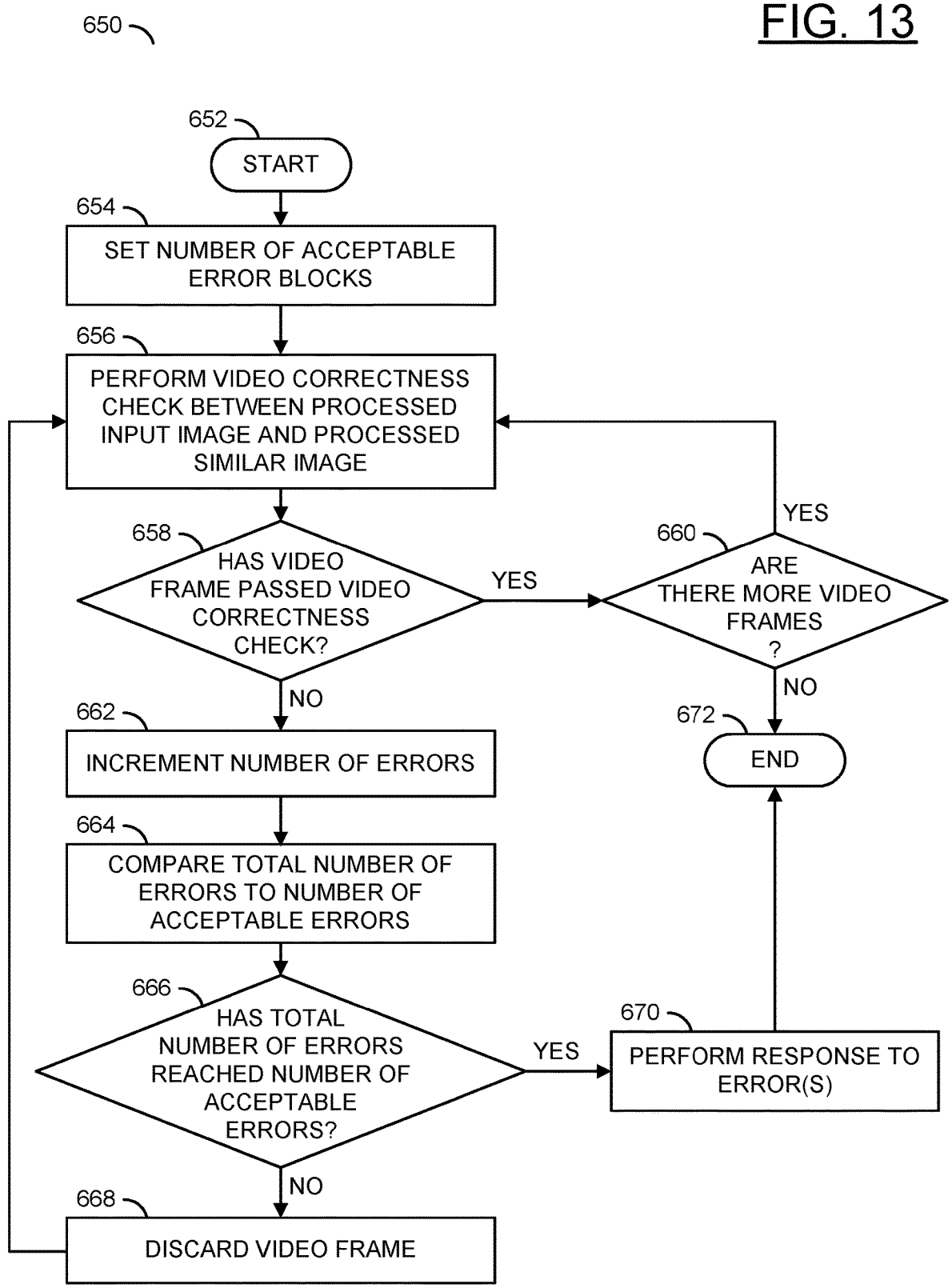
FIG. 13 is a flow diagram illustrating a method for performing a reaction in response to a number of error blocks detected.

Referring to FIG. 13, a method (or process) 650 is shown. The method 650 may perform a reaction in response to a number of error blocks detected. The method 650 generally comprises a step (or state) 652, a step (or state) 654, a step (or state) 656, a decision step (or state) 658, a decision step (or state) 660, a step (or state) 662, a step (or state) 664, a decision step (or state) 666, a step (or state) 668, a step (or state) 670, and a step (or state) 672.

The step 652 may start the method 650. In the step 654 a number of acceptable error blocks may be set. In an example, the number of acceptable error blocks may be a user-defined setting. For example, an end-user may set the number of acceptable error blocks via the signal USER. Next, in the step 656, the similarity analysis module 364 may perform the video correctness check between the processed input images 360a-360n and the processed similar images 362a-362n. Next, the method 650 may move to the decision step 658.

In the decision step 658, the similarity analysis module 364 may determine whether the video frame has passed the video correctness check. In an example, the signal RESULT may provide the result of the video correctness check. If the video frame has passed the video correctness check, then the method 650 may move to the decision step 660. In the decision step 660, the video processing pipeline 156 may determine whether there are more video frames. For example, the video processing pipeline 156 may perform the video correctness check for each of the input video frames 352a-352n. If there are more of the input video frames 352a-352n, then the method 650 may return to the step 656. If there are no more of the input video frames 352a-352n, then the method 650 may move to the step 672.

In the decision step 658, if one of the video frames has not passed the video correctness check, then the method 650 may move to the step 662. In the step 662, the processors 106a-106n may increment the total number of errors detected. In an example, the total number of errors detected may be a cumulative value of all of the error blocks 460 detected in each of the input video frames 352a-352n. In another example, the total number of errors detected may be a cumulative value of the number of the input video frames 352a-352n that have at least one of the error blocks 460 detected. Next, in the step 664, the processors 106a-106n may compare the total number of errors detected to an acceptable number of errors. In some embodiments, the total number of errors may comprise a count of the number of error blocks 460 in a single video frame. In some embodiments, the total number of errors may comprise a cumulative count of error blocks 460 detected in a sequence of the input video frames 352a-352n. Next, the method 650 may move to the decision step 666.

In the decision step 666, the processors 106a-106n may determine whether the total number of errors detected has reached the number of acceptable errors. The end-user may select a desired number of acceptable errors based on the use-case of the apparatus 100. In an example, for an automotive implementation with the video correctness configured to provide an integrity check for various systems of the vehicle 50, the number of acceptable errors may be one (e.g., detecting any error may be unacceptable). In another example, for a doorbell camera, more errors may be acceptable. If the total number of errors has not reached the acceptable number of errors, then the method 650 may move to the step 668. In the step 668, the processors 106a-106n may discard the one of the input video frames 352a-352n that has the error block 460. Next, the method 650 may return to the step 656.

In the decision step 666, if total number of errors has reached the acceptable number of errors, then the method 650 may move to the step 670. In the step 670, the processors 106a-106n may perform a response/reaction to the error block(s) 460. In an example, the reaction may comprise generating the signal VCTRL to initiate a reboot of the apparatus 100. In another example, the reaction may comprise generating the signal COM to provide a notification to the end-user (e.g., the notification may indicate that an error has been detected and/or the total number of errors detected). In yet another example, the reaction may comprise generating the signal VCTRL to activate and/or adjust cooling for the processors 106a-106n and/or the capture devices 102a-102n. Next, the method 650 may move to the step 672. The step 672 may end the method 650.

The functions performed by the diagrams of FIGS. 1-13 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

The designations of various components, modules and/or circuits as "a"-"n", when used herein, disclose either a singular component, module and/or circuit or a plurality of such components, modules and/or circuits, with the "n" designation applied to mean any particular integer number. Different components, modules and/or circuits that each have instances (or occurrences) with designations of "a"-"n" may indicate that the different components, modules and/or circuits may have a matching number of instances or a different number of instances. The instance designated "a" may represent a first of a plurality of instances and the instance "n" may refer to a last of a plurality of instances, while not implying a particular number of instances.

While the invention has been particularly shown and described with reference to embodiments thereof, it will be understood by those skilled in the art that various changes in form and details may be made without departing from the scope of the invention.

The invention claimed is:

1. An apparatus comprising:
   an interface configured to receive pixel data from a capture device; and
   a processor configured to (i) process said pixel data arranged as video frames, (ii) generate a similar image from said pixel data of a source image of said video frames, (iii) perform preprocessing on said source image and said similar image in parallel, (iv) perform a similarity check between said source image and said similar image and (v) determine an image correctness of said source image in response to said similarity check, wherein
   (a) a pipeline comprising multiple hardware paths for said preprocessing of said source image and said similar image simultaneously is implemented by said processor,
   (b) said video frames are discarded if said image correctness is below a threshold value, and
   (c) said image correctness is configured to detect a perceived change in structural information that occurs between said preprocessing of said source image and said preprocessing of said similar image.

2. The apparatus according to claim 1, wherein a similarity generator hardware module is implemented by said processor to generate said similar image.

3. The apparatus according to claim 1, wherein said similar image is generated in response to non-linear filtering and multiresolution linear filtering noise reduction.

4. The apparatus according to claim 1, wherein said processor is further configured to downscale said source image after said preprocessing and before said similarity check.

5. The apparatus according to claim 4, wherein said downscale of said source image comprises a block based decimation.

6. The apparatus according to claim 4, wherein said downscale of said source image is configured to match a size of said similar image.

7. The apparatus according to claim 1, wherein (i) said pipeline of said processor comprises a plurality of view zones configured to generate said source image and said similar image in parallel and (ii) said view zones comprise on-chip memory for said pixel data that correspond to a location on an image sensor of said capture device.

8. The apparatus according to claim 7, wherein each of said view zones are configured to receive said pixel data from a region of interest of said image sensor implemented by said capture device.

9. The apparatus according to claim 1, wherein said apparatus is rebooted in response to said image correctness being detected below said threshold value.

10. The apparatus according to claim 1, wherein said preprocessing comprises one or more of automatic white balance, demosaic, color correction, noise filtering, and sharpening.

11. The apparatus according to claim 1, wherein said capture device is implemented in a vehicle and said similarity check is configured to provide an integrity check for systems of said vehicle.

12. The apparatus according to claim 1, wherein said capture device is implemented as a surveillance camera and said similarity check is configured to prevent key video damage.

13. The apparatus according to claim 1, wherein said similarity check comprises determining said image correctness using a structural similarity calculation.

14. The apparatus according to claim 13, wherein said structural similarity calculation is performed on each 8×8 block of said source image and said similar image.

15. The apparatus according to claim 14, wherein said threshold value is 0.9 for said 8×8 block.

16. The apparatus according to claim 1, wherein an error number is incremented each time said image correctness of one of said video frames fails said similarity check and a reaction is performed in response to said error number reaching a user-defined error value.

17. The apparatus according to claim 1, wherein said similar image is generated corresponding to said source image for each of said video frames.

18. The apparatus according to claim 1, wherein said perceived change represents a visual defect caused by said preprocessing comprising at least one of blockiness, color error, broken line, and a bad spot in said source image after said preprocessing.

19. An apparatus comprising:
   an interface configured to receive pixel data from a capture device; and
   a processor configured to (i) process said pixel data arranged as video frames, (ii) generate similar images from said video frames, (iii) perform preprocessing on said video frames and said similar images, (iv) perform a similarity check between said video frames and said similar images and (v) determine an image correctness in response to said similarity check, wherein (a) said preprocessing of said video frames and said similar images uses a same hardware pipeline,
(b) said video frames are discarded if said image correctness is below a threshold value,
(c) said processor is further configured to downscale said video frames after said preprocessing and before said similarity check, and
(d) said similar images have a resolution of 160×96 and said downscale of said video frames comprises decimating said video frames down to said resolution of 160×96.

20. An apparatus comprising:

an interface configured to receive pixel data from a capture device; and a processor configured to (i) process said pixel data arranged as video frames, (ii) generate similar images from said video frames, (iii) perform preprocessing on said video frames and said similar images, (iv) perform a similarity check between said video frames and said similar images and (v) determine an image correctness in response to said similarity check, wherein
(a) said preprocessing of said video frames and said similar images uses a same hardware pipeline,
(b) said video frames are discarded if said image correctness is below a threshold value,
(c) said similarity check comprises determining said image correctness using a structural similarity calculation, and
(d) said structural similarity calculation is performed on each 8×8 block of said video frames and said similar images.

* * * * *